United States Patent
Ogaki et al.

(10) Patent No.: US 8,213,721 B2
(45) Date of Patent: Jul. 3, 2012

(54) PRODUCT IDENTIFICATION APPARATUS, PRODUCT IDENTIFICATION METHOD, AND PROGRAM

(75) Inventors: Shinji Ogaki, Tokyo (JP); Mitsuharu Ohki, Tokyo (JP); Hiroaki Ono, Kanagawa (JP)

(73) Assignee: Sony Corporation, Tokyo (JP)

(*) Notice: Subject to any disclaimer, the term of this patent is extended or adjusted under 35 U.S.C. 154(b) by 827 days.

(21) Appl. No.: 12/261,207

(22) Filed: Oct. 30, 2008

(65) Prior Publication Data

US 2009/0110295 A1    Apr. 30, 2009

(30) Foreign Application Priority Data

Oct. 31, 2007   (JP) ............................... P2007-283899

(51) Int. Cl.
*G06K 9/00*    (2006.01)
(52) U.S. Cl. ...................... 382/209; 382/145
(58) Field of Classification Search ............... 382/145, 382/209
See application file for complete search history.

(56) References Cited

U.S. PATENT DOCUMENTS 7,480,407 B2 *   1/2009   Imamura et al. ............... 382/173
7,773,749 B1 *   8/2010   Durst et al. ..................... 380/54
8,073,234 B2 * 12/2011   Harris et al. ................... 382/141

FOREIGN PATENT DOCUMENTS

JP    2005-10581       1/2005
JP    2007-041643      2/2007
JP    2007-256225     10/2007

* cited by examiner

*Primary Examiner* — Gregory M Desire
(74) *Attorney, Agent, or Firm* — Finnegan, Henderson, Farabow, Garrett & Dunner, L.L.P.

(57) ABSTRACT

A product identification apparatus for determining whether an inspection target product to be identified is the same as a predetermined verification product includes: an extraction unit configured to extract an input pattern formed of asperities on the surface of a predetermined part of the inspection target product from a captured image obtained by capturing the image of the predetermined part of the inspection target product; and a comparison unit configured to compare the input pattern with an identification pattern extracted from a captured image obtained by capturing in advance the image of a part of the verification product so as to determine whether the input pattern is the same as the identification pattern or the input pattern includes the identification pattern.

20 Claims, 13 Drawing Sheets

Q11

Q12

Q13

| TRANSFORMATION | SIMILARITY TRANSFORMATION | AFFINE TRANSFORMATION | PROJECTIVE TRANSFORMATION |
|---|---|---|---|
| INVARIANT | AC/AB (ANGLE) | △ADC/△ABC | (△ABD/△ACE) / (△ACD/△ABE) (CROSS RATIO) |
| POINT | THREE POINTS A, B, AND C | FOUR POINTS A, B, C, AND D | FIVE POINTS A, B, C, D, AND E |

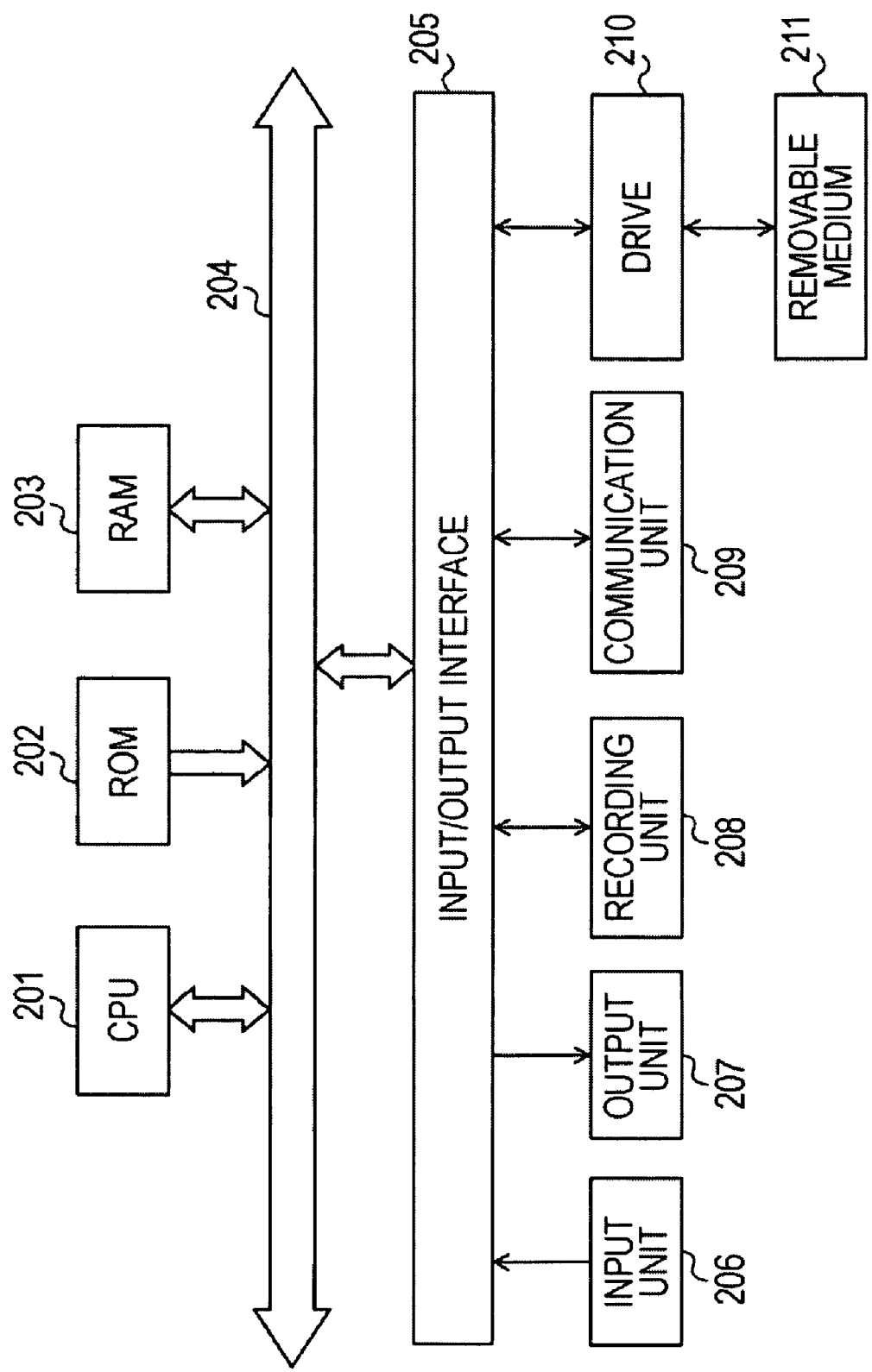

PRODUCT IDENTIFICATION APPARATUS, PRODUCT IDENTIFICATION METHOD, AND PROGRAM

CROSS REFERENCES TO RELATED APPLICATIONS

The present invention contains subject matter related to Japanese Patent Application JP 2007-283899 filed in the Japanese Patent Office on Oct. 31, 2007, the entire contents of which are incorporated herein by reference.

BACKGROUND OF THE INVENTION

1. Field of the Invention

The present invention relates to product identification apparatuses, product identification methods, and programs, and, more particularly, to a product identification apparatus and a product identification method which are suitable for determining the authenticity of a product or finding a stolen product and a program.

2. Description of the Related Art

Product identification verification techniques for specifying a stolen product or tracking a commodity product have been proposed. In such product identification verification techniques, an IC (Integrated Circuit) chip is embedded in a product, an identification code is recorded on the surface of a product using a special fluorescent coating that reacts with light of a specific wavelength, or a light polarizing film is placed on a product.

In the case of the above-described techniques, however, a special apparatus is necessary for the processing of an inspection target product or the identification and verification of the product. This increases the cost of identification and verification. As a technique for overcoming the above-described difficulty, a technique for inexpensively achieving the identification and verification of a product using a unique pattern on the surface of the product or a random pattern placed on the surface of the product has been proposed (see, for example, Japanese Unexamined Patent Application Publication No. 2005-10581).

In the case of this technique, it is unnecessary to perform special processing upon a product itself. The image of the surface of a product is captured so as to obtain a pattern on the surface of the product. Using the obtained pattern, the identification and verification of the product can be easily performed at relatively low cost.

SUMMARY OF THE INVENTION

However, if the pattern is changed due to the increased number of flaws on the surface of the product or the contaminated surface of the product, it is difficult to specify the product. In order to prevent the pattern change, a protection member is fixed to a part of the product which is used for identification and verification. This limits the applicability of the identification and verification technique. That is, for example, if it is hard to fix a protection member to an identification verification pattern area on the surface of a product, it is difficult to achieve the identification and verification of the product using the above-described technique.

Furthermore, it takes a great deal of time and effort to fix protection members to all products to be identified and verified.

It is desirable to provide a product identification apparatus and a product identification method capable of more easily achieving the identification and verification of a product with certainty.

A product identification apparatus according to an embodiment of the present invention is an apparatus for determining whether an inspection target product to be identified is the same as a predetermined verification product. The product identification apparatus includes: extracting means for extracting an input pattern formed of asperities on the surface of a predetermined part of the inspection target product from a captured image obtained by capturing the image of the predetermined part of the inspection target product; and comparing means for comparing the input pattern with an identification pattern extracted from a captured image obtained by capturing in advance the image of a part of the verification product so as to determine whether the input pattern is the same as the identification pattern or the input pattern includes the identification pattern.

The comparing means can calculate a transformation parameter used to make the sizes and rotation angles of the identification pattern and the input pattern conform to each other by performing generalized Hough transform processing using the input pattern and the identification pattern, and compare the identification pattern with the input pattern using the calculated transformation parameter.

The product identification apparatus can further include image capturing means for capturing the image of the inspection target product.

The product identification apparatus can further include communicating means for receiving the captured image of the inspection target product transmitted from another apparatus connected to the product identification apparatus via a communication network and transmitting a comparison result obtained by the comparing means.

The comparing means can detect the increase in the number of flaws on the part of the verification product on the basis of the difference between captured images of the identification pattern which have been captured at different image capturing times.

A product identification method according to an embodiment of the present invention is a method of determining whether an inspection target product to be identified is the same as a predetermined verification product. The product identification method includes the steps of: extracting an input pattern formed of asperities on the surface of a predetermined part of the inspection target product from a captured image obtained by capturing the image of the predetermined part of the inspection target product; and comparing the input pattern with an identification pattern extracted from a captured image obtained by capturing in advance the image of a part of the verification product so as to determine whether the input pattern is the same as the identification pattern or the input pattern includes the identification pattern.

A program according to an embodiment of the present invention is a program for a product identification process of determining whether an inspection target product to be identified is the same as a predetermined verification product. The program causes a computer to perform a process including the steps of: extracting an input pattern formed of asperities on the surface of a predetermined part of the inspection target product from a captured image obtained by capturing the image of the predetermined part of the inspection target product; and comparing the input pattern with an identification pattern extracted from a captured image obtained by capturing in advance the image of a part of the verification product so as to determine whether the input pattern is the same as the identification pattern or the input pattern includes the identification pattern.

According to an embodiment of the present invention, in a product identification apparatus for determining whether an inspection target product to be identified is the same as a predetermined verification product, an input pattern formed of asperities on the surface of a predetermined part of the inspection target product is extracted from a captured image obtained by capturing the image of the predetermined part of the inspection target product, the input pattern is compared with an identification pattern extracted from a captured image obtained by capturing in advance the image of a part of the verification product so as to determine whether the input pattern is the same as the identification pattern or the input pattern includes the identification pattern.

According to an embodiment of the present invention, the identification and verification of a product can be more easily performed with certainty.

BRIEF DESCRIPTION OF THE DRAWINGS

FIG. 20 is a block diagram illustrating an exemplary configuration of a computer.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that embodiments supporting the claimed invention are described in this specification or drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

A product identification apparatus according to an embodiment of the present invention is an apparatus for determining whether an inspection target product to be identified is the same as a predetermined verification product. The product identification apparatus includes: extracting means for extracting an input pattern formed of asperities on the surface of a predetermined part of the inspection target product from a captured image obtained by capturing the image of the predetermined part of the inspection target product (for example, an extraction unit 22 illustrated in FIG. 1); and comparing means for comparing the input pattern with an identification pattern extracted from a captured image obtained by capturing in advance the image of a part of the verification product so as to determine whether the input pattern is the same as the identification pattern or the input pattern includes the identification pattern (for example, a comparison unit 24 illustrated in FIG. 1).

Figure 8:
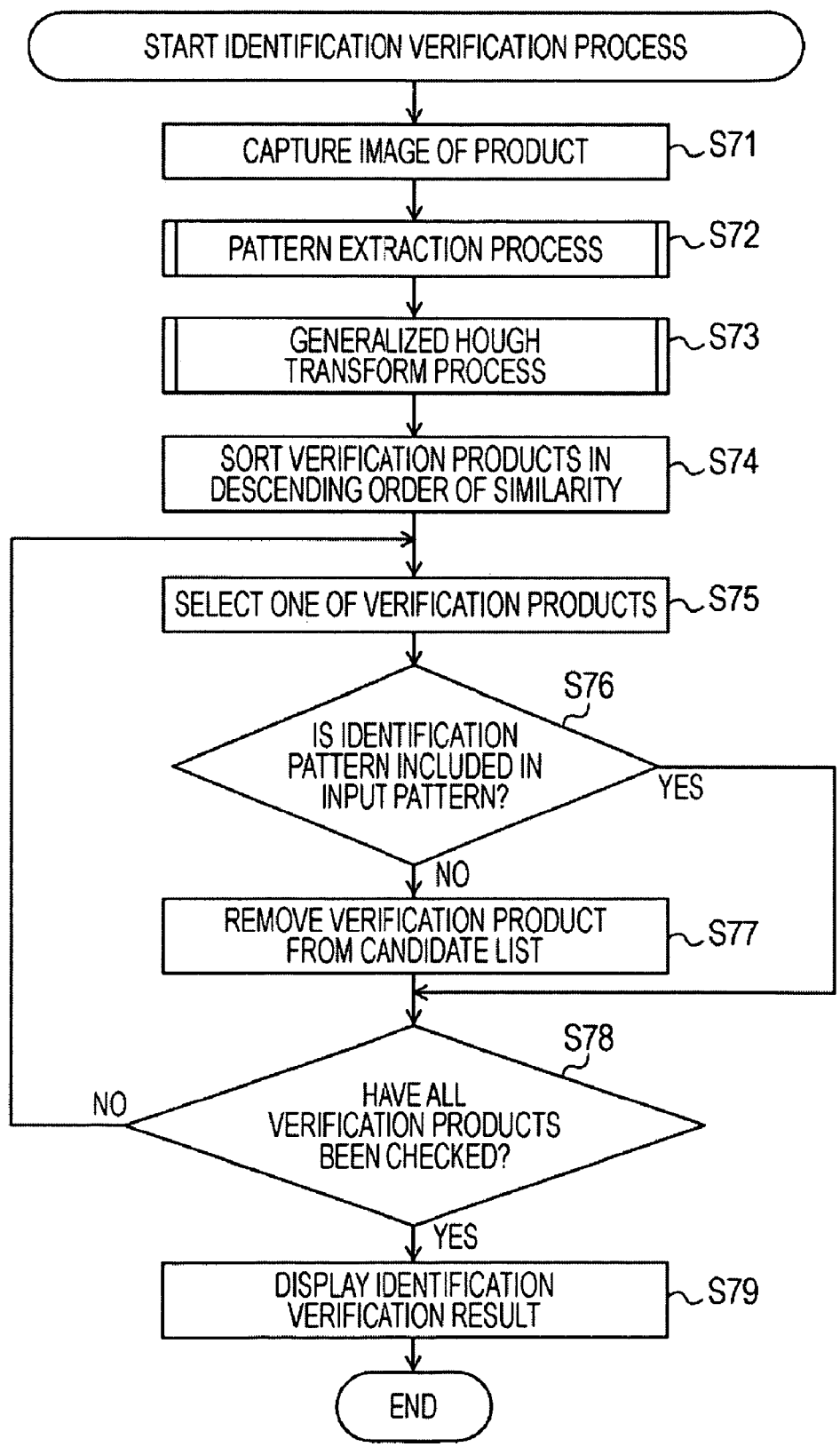
FIG. 8 is a flowchart describing an identification verification process.

The comparing means can calculate a transformation parameter used to make the sizes and rotation angles of the identification pattern and the input pattern conform to each other by performing generalized Hough transform processing using the input pattern and the identification pattern, and compare the identification pattern with the input pattern using the calculated transformation parameter (for example, the processing performed in step S76 in FIG. 8).

Figure 1:
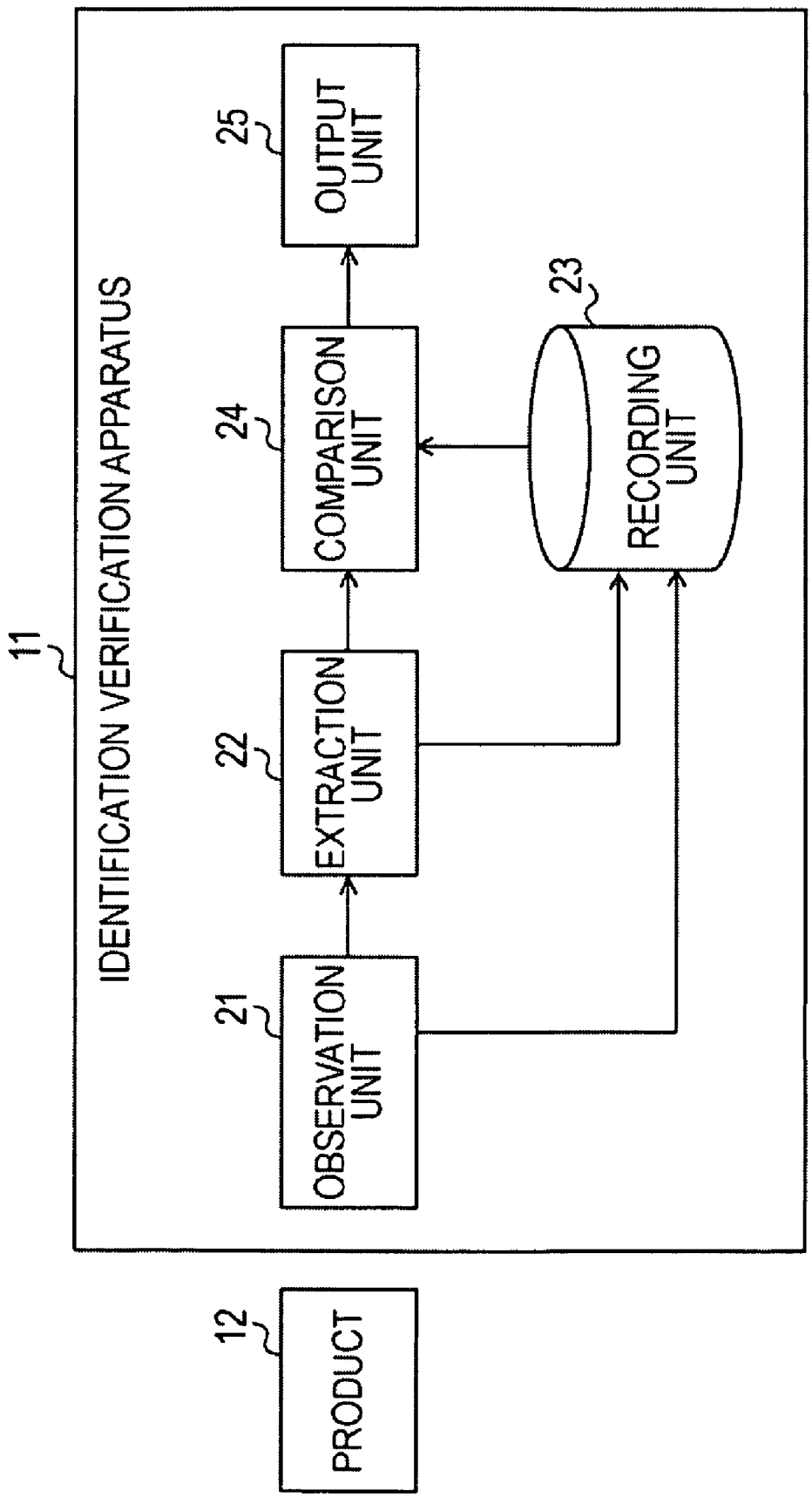
FIG. 1 is a block diagram illustrating an exemplary configuration of an identification verification apparatus according to an embodiment of the present invention.

The product identification apparatus can further include image capturing means for capturing the image of the inspection target product (for example, an observation unit 21 illustrated in FIG. 1).

Figure 19:
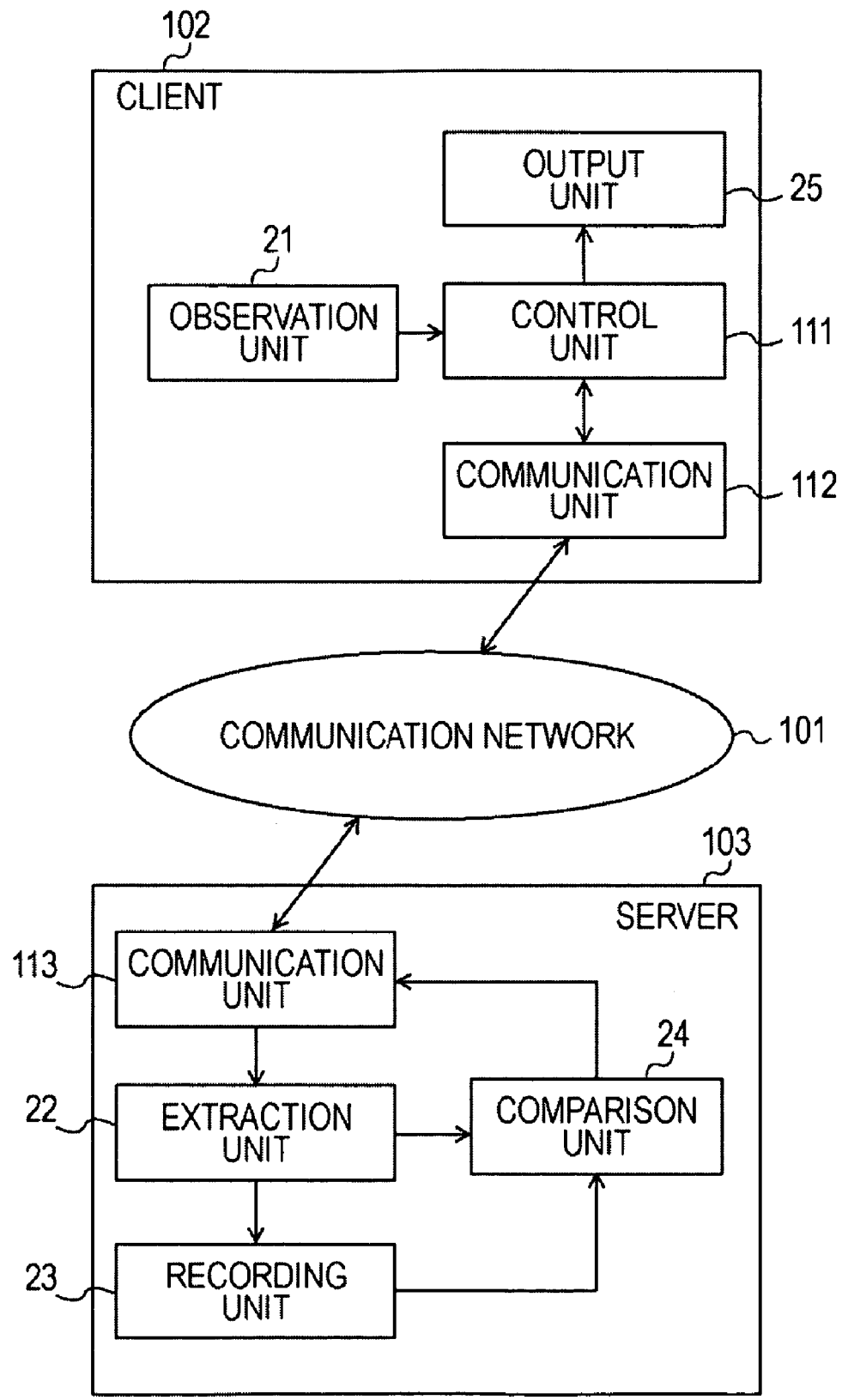
FIG. 19 is a diagram illustrating an exemplary configuration of an identification verification system according to another embodiment.

The product identification apparatus can further include communicating means for receiving the captured image of the inspection target product transmitted from another apparatus connected to the product identification apparatus via a communication network and transmitting a comparison result obtained by the comparing means (for example, a communication unit 113 illustrated in FIG. 19).

A product identification method or a program according to an embodiment of the present invention is a method of or program for determining whether an inspection target product to be identified is the same as a predetermined verification product. The product identification method or program includes the steps of: extracting an input pattern formed of asperities on the surface of a predetermined part of the inspection target product from a captured image obtained by capturing the image of the predetermined part of the inspection target product (for example, step S72 illustrated in FIG. 8); and comparing the input pattern with an identification pattern extracted from a captured image obtained by capturing in advance the image of a part of the verification product so as to determine whether the input pattern is the same as the identification pattern or the input pattern includes the identification pattern (for example, step S76 illustrated in FIG. 8).

The embodiments of the present invention will be described with reference to the accompanying drawings.

FIG. 1 is a block diagram illustrating an exemplary configuration of an identification verification apparatus according to an embodiment of the present invention.

An identification verification apparatus 11 performs the identification and verification of a product 12, which is an inspection target product, by determining whether the product 12 is the same as a predetermined verification product using a unique pattern or a random pattern of, for example, flaws on the surface of the product 12. That is, the identification verification apparatus 11 performs the identification and verification of the product 12 by determining whether the product 12 is the same as a verification product or one of a plurality of verification products using a pattern formed of asperities such as designs or flaws on the surface of the product 12.

The product 12 may be any product having a unique pattern on the metal, wood, leather, or paper surface thereof, or any product made of a material that can be flawed. The material of the product 12 is not limited to an opaque material, and may be a transparent material such as glass or cellophane.

The pattern of unintentional flaws of the product 12 or the pattern unique to the material of the product 12 is unique to the product 12. Accordingly, there are no products having the same pattern as the product 12. In the identification verification apparatus 11, such a unique pattern is used for the identification and verification of each product. The pattern on the surface of the product 12 may be the pattern of flaws that are intentionally made for the purpose of determination of authentication.

The identification verification apparatus 11 includes the observation unit 21, the extraction unit 22, a recording unit 23, the comparison unit 24, and an output unit 25.

The observation unit 21 includes one or more image pickup apparatuses such as cameras, and captures the image of an area of the product 12 which includes a pattern used for identification and verification (hereinafter referred to as an identification verification pattern area). That is, the observation unit 21 receives light reflected from or passed through the identification verification pattern area of the product 12 and photoelectrically converts the light received, thereby capturing the image of the identification verification pattern. Subsequently, the observation unit 21 supplies the captured image to the extraction unit 22, and also supplies the captured image and information about the image capturing date and time of the captured image to the recording unit 23 so as to cause the recording unit 23 to record them.

Since the pattern of the product 12 may be a microscopic pattern, the observation unit 21 may include a microscope used for image capturing of the pattern and a light source used to illuminate the product 12.

Various techniques in the related art may be used to capture the clear image of the pattern of the product 12. These techniques include a technique for applying fluorescent magnetic powder or fluorescent dye to the identification verification pattern area of the product 12 and illuminating the identification verification pattern area with ultraviolet light and a technique for changing an angle of light that is emitted from a light source and is applied to the pattern in accordance with the depth of a flaw functioning as a pattern or the shape of a groove functioning as a pattern.

The extraction unit 22 extracts a pattern from the captured image supplied from the observation unit 21 as a pattern image, and supplies the pattern image to the comparison unit 24 or the recording unit 23. The pattern image supplied to the comparison unit 24 is the pattern image of an inspection target product. The pattern image supplied to the recording unit 23 is the pattern image of a verification product used for the identification and verification of an inspection target product.

The recording unit 23 includes, for example, a hard disk drive. The recording unit 23 associates the captured image and the information about the image capturing date and time of the captured image which are supplied from the observation unit 21 with the pattern image supplied from the extraction unit 22 and records them. Furthermore, the recording unit 23 supplies a recorded pattern image to the comparison unit 24.

The comparison unit 24 compares the pattern image supplied from the extraction unit 22 with the pattern image recorded in the recording unit 23, and outputs the comparison result to the output unit 25. That is, the comparison unit 24 compares the pattern of the product 12 that is an inspection target product (hereinafter also referred to as an input pattern) with the pattern of a verification product which is recorded in advance in the recording unit 23 (hereinafter also referred to as a verification pattern) so as to determine whether the input pattern is the same as the verification pattern or the input pattern includes the verification pattern.

If the input pattern is the same as the verification pattern or the input pattern includes the verification pattern, the comparison unit 24 determines that the product 12, which is an inspection target product, is the same as the verification product. That is, it is determined that the product 12 is genuine. The pattern image of an input pattern is also referred to as an input pattern image, and the pattern image of an identification pattern is also referred to as an identification pattern image.

The output unit 25 includes a display apparatus such as a display, and displays the comparison result supplied from the comparison unit 24.

In order to perform the identification and verification of a predetermined inspection target product by determining whether the inspection target product is the same as a verification product, that is, the inspection target product is genuine, for the purpose of checking the authenticity of the inspection target product or finding a stolen product, it is necessary to record in advance in the recording unit 23 the captured images of identifications patterns of verification products which are to be compared with the input pattern of the inspection target product, that is, identification pattern images.

The identification verification apparatus 11 starts an identification pattern image generation process of generating an identification pattern image and recording the generated identification pattern image in response to a user's instruction for generating an identification pattern image of a verification product. An identification pattern image generation process performed by the identification verification apparatus 11 will be described below with reference to a flowchart illustrated in FIG. 2.

In step S11, the observation unit 21 captures the image of the product 12 that is a verification product, and supplies the captured image to the extraction unit 22. Furthermore, the observation unit 21 supplies the captured image and information about image capturing date and time of the captured image to the recording unit 23.

In step S12, the extraction unit 22 performs a pattern extraction process, that is, extracts an identification pattern from the captured image supplied from the observation unit 21 so as to generate an identification pattern image. Subsequently, the extraction unit 22 supplies the generated identification pattern image to the recording unit 23. The pattern extraction process will be described in detail later.

In step S13, the recording unit 23 associates the captured image and the information about image capturing date and time of the captured image which are supplied from the observation unit 21 with the identification pattern image supplied from the extraction unit 22 and records them. The pattern extraction process ends.

Thus, the identification verification apparatus 11 generates an identification pattern image and records the generated identification pattern image. By generating an identification pattern image and recording the generated identification pattern image in advance, it can be determined whether a predetermined inspection target product is the same as a verification product using the identification pattern image so as to perform identification and verification of the inspection target product.

The pattern extraction process performed in step S12 illustrated in FIG. 2 will be described with reference to a flowchart illustrated in FIG. 3.

In step S41, the extraction unit 22 achieves uniform brightness throughout the captured image supplied from the observation unit 21.

It is desirable to capture the image of the product 12 under the condition that the image capturing area of the product 12 is equally illuminated. In reality, however, it is difficult to perform image capturing under such a condition. Accordingly, in order to extract a pattern with more certainty, it is necessary to eliminate variations in brightness value (pixel value) of the surface of the captured image of the product 12.

For example, the following method is used. The extraction unit 22 supplies the captured image to the output unit 25 via the comparison unit 24 so as to cause the output unit 25 to display the captured image. Subsequently, a user inputs a polygon enclosing an area in which a pattern is displayed on the displayed captured image by operating the identification verification apparatus 11. The extraction unit 22 corrects the values of pixels in the polygon using the pixel values of vertices of the polygon.

Figure 4:
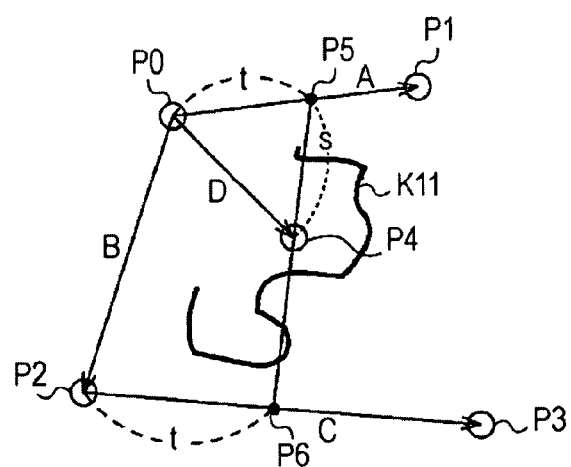
FIG. 4 is a diagram describing processing for making the brightness of a captured image uniform.

More specifically, for example, it is assumed that a user inputs a quadrilateral illustrated in FIG. 4 as a polygon enclosing a pattern area. Referring to FIG. 4, a quadrilateral having points P0 to P3 as vertices is input by a user. A curve K11 denotes a pattern, and, more particularly, the core line of the pattern.

A vector from a point P0 to a point P1 is defined as a vector A, a vector from the point P0 to a point P2 is defined as a vector B, a vector from the point P2 to a point P3 is defined as a vector C, and a vector from the point P0 to a point P4 that is any point in the quadrilateral is defined as a vector D. It is assumed that the pixel value of a point P4 is corrected.

A point on a line segment joining the points P0 and P1 (a line segment P0P1) is defined as a point P5, and it is assumed that the length ratio between the line segment P0P1 and a line segment P0P5 is 1:t. A point on a line segment joining the points P2 and P3 (a line segment P2P3) is defined as a point P6, and it is assumed that the length ratio between the line segment P2P3 and a line segment P2P6 is 1:t. The value of t denoting the length ratio of the line segment P0P5 to the line segment P0P1 is determined so that the point P4 is on a line segment joining the points P5 and P6 (a line segment P5P6). It is assumed that the length ratio between the line segment P5P6 and a line segment P5P4 is 1:s.

At that time, the vector D having the P4, which is any point, as an endpoint is denoted by the following equation 1 using the vectors A, B, and C and the parameters t and s.

$$D=(1-s)(tA)+s(B+tC) \quad (1)$$

Since the vectors A to D are vectors on a two-dimensional plane, equation 1 substantially becomes simultaneous equations. Accordingly, the parameters t and s can be obtained by solving equation 1. Here, the values of pixels on the points P0, P1, P2, and P3 are defined as L0, L1, L2, and L3, respectively. By solving equation 2 including these pixel values and the calculated parameters, a pixel value Ld of the point P4 can be obtained by interpolation.

$$Ld=(1-s)((1-t)L0+tL1)+s((1-t)L2+tL3) \quad (2)$$

The pixel value Ld obtained from equation 2 denotes the average brightness of the point P4 with respect to the points P0 to P3, that is, the pixel value of the point P4 which is obtained by interpolation using the pixel values of the points P0 to P3 when a pattern does not exist at the point P4. In the extraction unit 22, an actual pixel value of the point P4 is divided by the pixel value Ld obtained by solving equation 2. The division result is set as the corrected pixel value of the point P4. Thus, if the pixel values of all points in the polygon having the points P0 to P3 as vertices are corrected, uniform brightness can be achieved throughout the area of the polygon. Consequently, a pattern can be extracted with more certainty from the captured image.

Referring back to FIG. 3, if uniform brightness can be achieved throughout the captured image, in step S42, the extraction unit 22 binarizes the captured image of uniform brightness. That is, the extraction unit 22 compares the pixel value of each pixel included in the captured image with a threshold value, and sets the pixel value of the pixel to one of two values determined in advance in accordance with the comparison result, thereby binarizing the captured image. The threshold value used for the binarization may be determined by a user, or may be determined in accordance with an algorithm such as a discriminant analysis binarization method.

In step S43, the extraction unit 22 performs thinning upon the binarized captured image so as to extract an identification pattern from the captured image. For example, by performing thinning, the image of an identification pattern denoted by a core line of the width of a single pixel is generated. Subsequently, the extraction unit 22 supplies the identification pattern image obtained by performing thinning upon the captured image to the recording unit 23 so as to cause the recording unit 23 to record the identification pattern image. Subsequently, the process proceeds to step S13 illustrated in FIG. 2, and the pattern extraction process ends.

Thus, the extraction unit 22 binarizes the captured image and performs thinning upon the binarized captured image so as to generate an identification pattern image. The identification pattern image is recorded in advance. Using the recorded identification pattern image, the identification and verification of the product 12 can be performed.

Figure 5A:
FIGS. 5A, 5B, and 5C are diagrams describing pattern correction.
Figure 5B:

For example, if the image of the surface of the product 12 having a pattern illustrated in FIG. 5A is captured and an identification pattern is extracted from the captured image, as illustrated in FIG. 5B, the image of an identification pattern that has the same shape as the pattern illustrated in FIG. 5A can be obtained under the normal circumstances. In some cases, however, as illustrated in FIG. 5C, the image of an identification pattern that has a shape different from that of the pattern illustrated in FIG. 5A is obtained.

FIG. 5A illustrates the pattern on the surface of the product 12. FIGS. 5B and 5C illustrate the identification pattern images generated from the captured image. Referring to FIG. 5B, the shape of the pattern denoted by a core line is the same as that of the pattern illustrated in FIG. 5A.

In particular, a portion denoted by an arrow Q11 in FIG. 5A in which lines cross each other is correctly extracted as a part of an identification pattern as illustrated in an area Q12 in FIG. 5B in which two core lines cross each other.

Figure 5C:
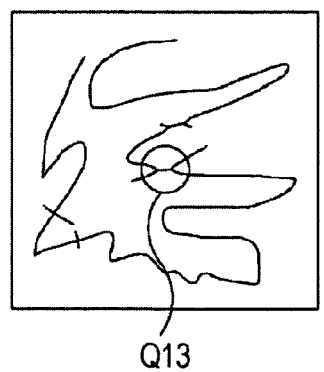

In contrast, as illustrated in an area Q13 in FIG. 5C in which a core line is divided into three branches, the portion denoted by the arrow Q11 in FIG. 5A is not correctly extracted as a part of the pattern of the product 12.

Thus, it is desirable to obtain the identification pattern image illustrated in FIG. 5B. In some cases, however, as illustrated in FIG. 5c, it is difficult to correctly extract an identification pattern from the captured image. In this case, the extraction unit 22 may correct an identification pattern extracted from the captured image in the pattern extraction process.

Figure 6A:
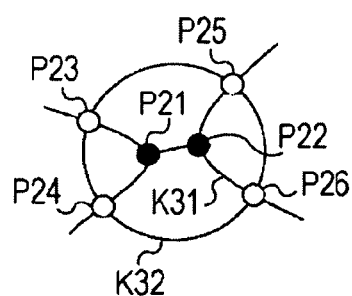
FIGS. 6A and 6B are diagrams describing pattern correction.

More specifically, the extraction unit 22 searches for a point at which the core line of an identification pattern is divided into three branches on an identification pattern image obtained by performing thinning upon a captured image. As a result, for example, as illustrated in FIG. 6A, points P21 and P22 at each of which a core line K31 denoting an identification pattern is divided into three branches are found.

Under the normal circumstances, in the identification pattern, two core lines cross each other without being trifurcated. Accordingly, the extraction unit 22 corrects the points P21 and P22 that are core line trifurcation points.

That is, if a circle K32 centered on the midpoint between the points P21 and P22 is made so as to include the points P21 and P22 when the points P21 and P22 are very close to each other, the core lines K31 and the circle K32 intersect at four points P23 to P26. The extraction unit 22 corrects the identification pattern by performing reconnection of the core lines K31 in the circle K32.

Figure 6B:
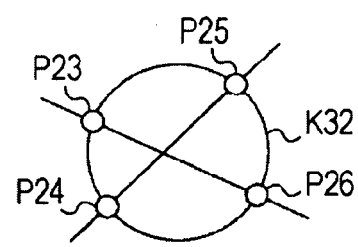

For example, as illustrated in FIG. 6B, the extraction unit 22 corrects the identification pattern so that the two core lines intersect in the circle K32. Referring to FIG. 6B, the identification pattern is corrected so that the line joining the points P23 and P26 and the line joining the points P24 and P25 become the core lines of the identification pattern. As a result, the correct extraction of the identification pattern from the captured image is achieved.

Figure 7A:
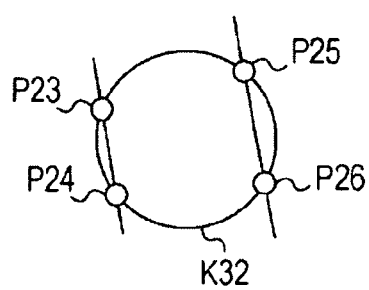
FIGS. 7A, 7B, and 7C are diagrams describing the reconnection of core lines.
Figure 7B:
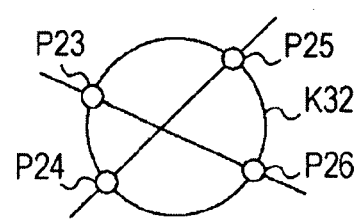
Figure 7C:
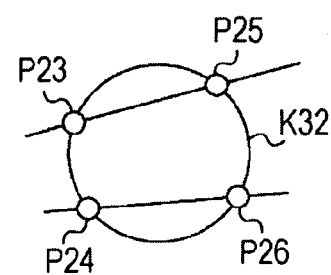

As illustrated in FIGS. 7A to 7C, there are three combinations of two line segments each connecting two of the four points P23 to P26. The extraction unit 22 selects a combination allowing the two line segments to intersect in the circle K32 from among the three combinations.

Among the combinations used for reconnecting the four points P23 to P26, in the combination illustrated in FIG. 7A, the line segment joining the points P23 and P24 and the line segment joining P25 and P26 are set as core lines of an identification pattern, and do not intersect in the circle K32. In the combination illustrated in FIG. 7B, the line segment joining the points P23 and P26 and the line segment joining P24 and P25 are set as core lines of the identification pattern, and intersect in the circle K32.

In the combination illustrated in FIG. 7C, the line segment joining the points P23 and P25 and the line segment joining P24 and P26 are set as core lines of the identification pattern, and do not intersect in the circle K32. Accordingly, the extraction unit 22 performs reconnection of line segments using the combination allowing the line segments to intersect in the circle K32 illustrated in FIG. 7B.

In order to reconnect line segments using such a combination of the two line segments, the extraction unit 22 may denote the two line segments as vectors in each of the three combinations, calculate the intersection point of the line segments using the vectors, and select a combination including an intersection point satisfying a predetermined condition from among the three combinations.

For example, the intersection points of core lines and a circle centered on the midpoint between a trifurcation point of one of the core lines and a trifurcation point of the other one of the core lines are defined as points PC1 to PC4. The coordinates of the PC1 to PC4 are defined as (x1, y1), (x2, y2), (x3, y3), and (x4, y4), respectively. Vectors from the origin of the X-Y coordinate system to the points PC1 to PC4 are defined as vectors Pb1 to Pb4, respectively.

The intersection point of a line segment PC1PC2 joining the points PC1 and PC2 and a line segment PC3PC4 joining the points PC3 and PC4 is defined as an intersection point P0. A vector from the origin to the intersection point P0 is defined as a vector Pbo.

The vector Pbo is denoted by equation 3 using the vectors Pb1 and Pb2 and equation 4 using the vectors Pb3 and Pb4.

$$Pbo = Pb1 + ua(Pb2 - Pb1) \quad (3)$$

$$Pbo = Pb3 + ub(Pb4 - Pb3) \quad (4)$$

Parameters us and ub used in equations 3 and 4 are denoted by equations 5 and 6, respectively.

$$ua = \frac{(x4-x3)(y1-y3)-(y4-y3)(x1-x3)}{(y4-y3)(x2-x1)-(x4-x3)(y2-y1)} \quad (5)$$

$$ub = \frac{(x2-x1)(y1-y3)-(y2-y1)(x1-x3)}{(y4-y3)(x2-x1)-(x4-x3)(y2-y1)} \quad (6)$$

The vector (Pb2−Pb1) denoted in equation 3 is a vector from the point PC1 to the point PC2. Accordingly, in order to place the intersection point P0 in the circle passing through the points PC1 to PC4, it is necessary for the parameter ua denoted in equation 3 to be a value between 0 and 1 (both inclusive). The vector (Pb4−Pb3) denoted in equation 4 is a vector from the point PC3 to the point PC4. Accordingly, in order to place the intersection point P0 in the circle passing through the points PC1 to PC4, it is necessary for the parameter ub denoted in equation 4 to be a value between 0 and 1 (both inclusive).

Accordingly, the extraction unit 22 selects the combination of line segments satisfying the following equations 7 and 8 and uses the selected combination for the correction of an identification pattern.

$$0 \leq ua \leq 1 \quad (7)$$

$$0 \leq ub \leq 1 \quad (8)$$

Thus, by correcting an identification pattern, an identification pattern can be more accurately extracted from a captured image. The extraction unit 22 may correct not only a trifurcated portion but also other portions in which problems occurs due to the defect of a thinning algorithm.

As described previously, if the captured image of a verification product and an identification pattern image are recorded in the recording unit 23, the identification and verification of the product 12, which is an inspection target product, can be performed using the captured image and the identification pattern image. Upon receiving an identification verification instruction input by a user, the identification verification apparatus 11 starts an identification verification process so as to perform the identification and verification of the product 12.

The identification verification process performed by the identification verification apparatus 11 will be described with reference to a flowchart illustrated in FIG. 8.

Figure 2:
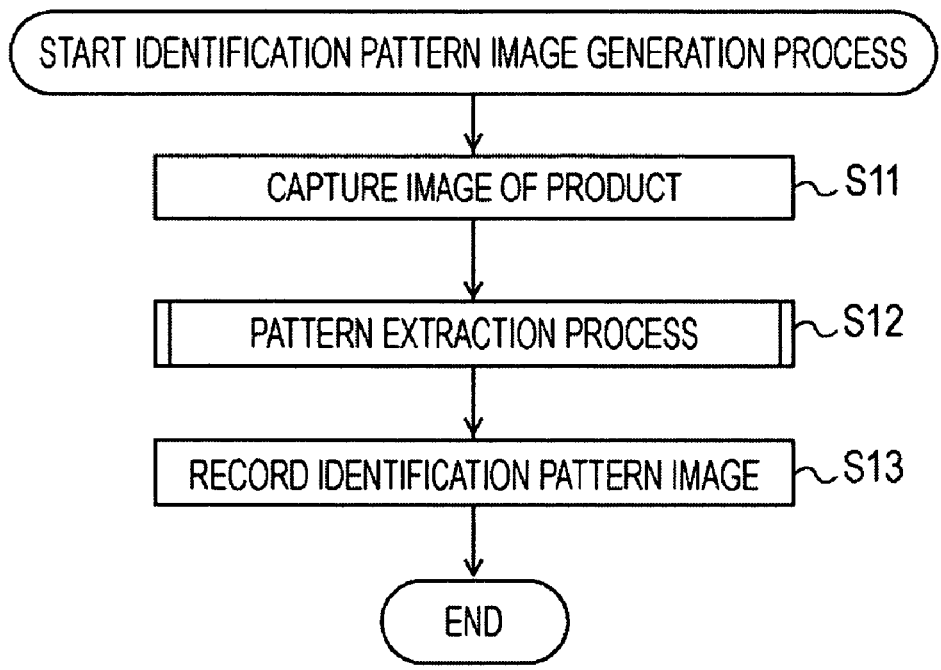
FIG. 2 is a flowchart describing an identification pattern image generation process.
Figure 3:
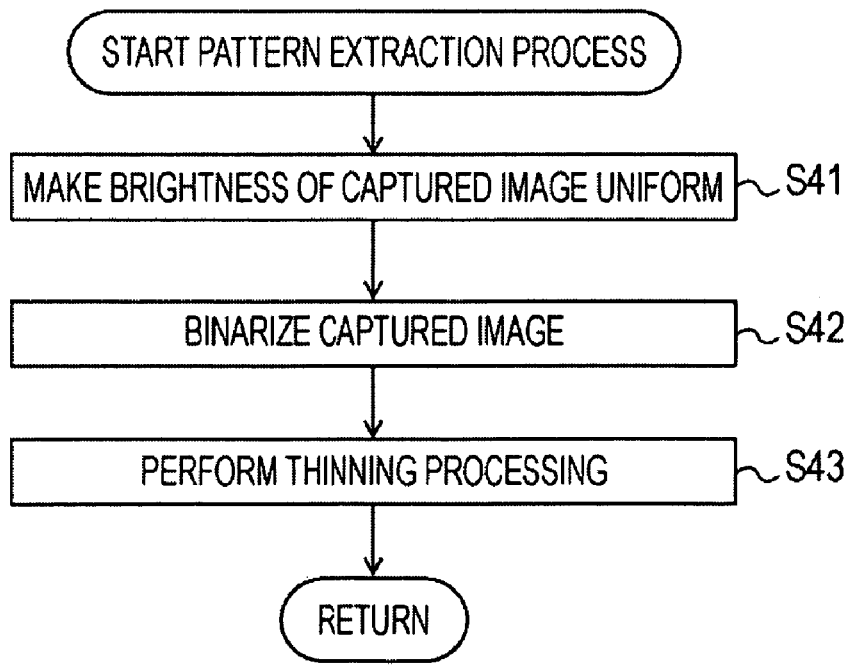
FIG. 3 is a flowchart describing a pattern extraction process.

The processing of step S71 and the processing of step S72 are the same as that of the step S11 illustrated in FIG. 2 and that of the step S12 illustrated in FIG. 2, respectively, and the descriptions thereof will be omitted. That is, the observation unit 21 captures the image of the product 12 that is an inspection target product, and supplies the captured image to the extraction unit 22. The extraction unit 22 extracts a pattern of the product 12 (input pattern) from the captured image supplied from the observation unit 21 so as to generate an input pattern image. The extraction unit 22 supplies the generated input pattern image to the comparison unit 24.

In step S73, the comparison unit 24 performs a generalized Hough transform process. The generalized Hough transform process will be described in detail later. In this generalized Hough transform process, the comparison unit 24 calculates the level of similarity between each identification pattern image recorded in the recording unit 23 and an input pattern image supplied from the extraction unit 22.

That is, the comparison unit 24 calculates the level of similarity between an identification pattern and an input pattern for each verification product. In order to calculate the similarity level, the comparison unit 24 calculates a transformation parameter used for transforming each identification pattern into a pattern of the same size and the same inclination angle (rotation angle) as those of the input pattern. More specifically, the comparison unit 24 performs voting so as to determine which of transformation parameter candidates is likely to be a transformation parameter for the identification pattern image, and sets one of the transformation parameter candidates having the largest number of votes obtained as a transformation parameter for the identification pattern image. Furthermore, the comparison unit 24 calculates the similarity level in accordance with the number of votes obtained of the transformation parameter set for the identification pattern image.

That is, the similarity level of each identification pattern image denotes the likelihood of the transformation parameter for the identification pattern image. This transformation parameter is used when the identification and verification of an input pattern is performed using an identification pattern. If the input pattern and the identification pattern are the same, a pattern obtained by transforming the identification pattern using a transformation parameter becomes the input pattern itself.

Thus, if the similarity level of each verification product (identification pattern image) is obtained by performing the generalized Hough transform process, in step S74, the comparison unit 24 sorts verification products corresponding to identification pattern images in descending order of similarity level. As a result, the verification products (pieces of information about the verification products) are arranged in descending order of similarity level between an identification pattern and an input pattern.

Only verification products having a similarity level higher than a predetermined threshold level may be selected from among verification products for each of which a similarity level is calculated in step S74 and then be sorted in descending order of similarity level. Alternatively, the predetermined number of verification products may be selected from among the verification products in descending order of similarity level and then be sorted.

In step S75, the comparison unit 24 selects one of the sorted verification products. For example, the comparison unit 24 sequentially selects the verification products in descending order of similarity level.

In step S76, the comparison unit 24 determines whether an identification pattern is included in the input pattern using the identification pattern image of the selected verification product and the transformation parameter calculated for the identification pattern image.

For example, in step S76, if an identification pattern and an input pattern are identical to each other or the identification pattern is included in the input pattern, it is determined that the identification pattern is included in the input pattern.

That is, the comparison unit 24 transforms the identification pattern of the identification pattern image of the selected verification product so that the size and the rotation angle of the identification pattern are the same as those of the input pattern. Subsequently, the comparison unit 24 superimposes an identification pattern obtained by the above-described transformation on the input pattern so as to determine whether the obtained identification pattern is the same as the input pattern or is included in the input pattern. If the obtained identification pattern is the same as the input pattern or is included in the input pattern, it is determined that the identification pattern is included in the input pattern.

If it is determined in step S76 that an identification pattern is not included in the input pattern, in step S77, the comparison unit 24 determines that the selected verification product is not the same as the product 12 that is an inspection target product, and removes the selected verification product from the candidates that are likely to be the inspection target product. That is, the comparison unit 24 deletes the selected verification product from the list of the verification products (pieces of information about the verification products) arranged in descending order of similarity level.

On the other hand, if it is determined in step S76 that an identification pattern is included in the input pattern, the comparison unit 24 determines that the selected verification product is the same as the product 12 that is an inspection target product. More specifically, it is determined that there is a possibility that the selected verification product is the same as the product 12 in step S76. Subsequently, the processing of step S77 is skipped, and the process proceeds to step S78.

If the selected verification product is removed from the candidates in step S77 or it is determined in step S76 that an identification pattern is included in the input pattern, in step S78, the comparison unit 24 determines whether all verification products have undergone the determination of whether an identification pattern is included in the input pattern.

If it is determined in step S78 that all the verification products have not yet been undergone the determination of whether an identification pattern is included in the input pattern, the process returns to step S75 in which the next verification product is selected.

On the other hand, if it is determined in step S78 that all the verification products have been undergone the determination of whether an identification pattern is included in the input pattern, the process proceeds to step S79. In step S79, the output unit 25 displays the result of the comparison between each identification pattern and the input pattern, that is, the result of the identification and verification of the inspection target product. Subsequently, the identification verification process ends.

That is, as the result of the comparison between each identification pattern and the input pattern, the comparison unit 24 supplies to the output unit 25 pieces of information about remaining verification products that have not been removed in step S77 from the list of the verification products (pieces of information about the verification products) sorted in step S74 in descending order of similarity level. Accordingly, pieces of information about verification products that are likely to be the same as the product 12 that is an inspection target product, that is, pieces of information about verification products having the same pattern as the input pattern or a pattern included in the input pattern, are supplied to the output unit 25.

The output unit 25 displays the comparison result supplied from the comparison unit 24. As a result, pieces of information about verification products that are assumed to be the same as the product 12 that is an inspection target product, for example, product names or product registration numbers, are displayed in descending order of similarity level. Along with the pieces of information about the verification products, the similarity levels or transformation parameters of the verification products may be displayed.

Thus, the identification verification apparatus 11 compares an identification pattern with an input pattern so as to determine whether the identification pattern is the same as the input pattern or is included the input pattern. If the identification pattern is the same as the input pattern or is included in the input pattern, the identification verification apparatus 11 determines that the inspection target product is the same as the verification product.

As described previously, it is determined that the inspection target product is the same as the verification product when the identification pattern is the same as the input pattern or is included in the input pattern. By using this method, even if the surface of the product 12, which is an inspection target product, is damaged, the identification and verification of the product 12 can be more easily performed with certainty without using a protection member.

Figure 9A:
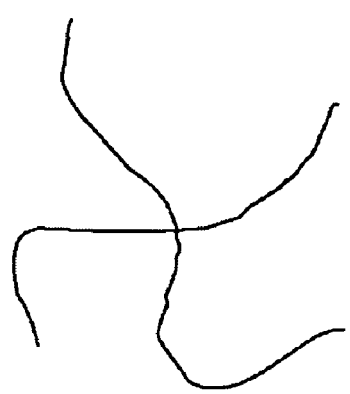
FIGS. 9A and 9B are diagrams describing the increase in the number of flaws over time.
Figure 9B:
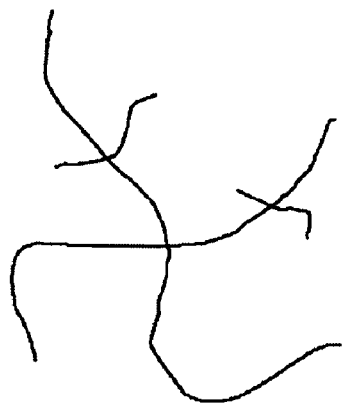

For example it is assumed that the product 12 has a pattern illustrated in FIG. 9A on the surface thereof. This pattern is unique to the product 12. However, if the surface of the product 12 is damaged, for example, the surface of the product 12 is scratched or contaminated, the pattern on the surface of the product 12 is changed. For example, it is assumed that the pattern illustrated in FIG. 9A is changed to a pattern illustrated in FIG. 9B due to damage from something. Referring to the pattern illustrated in FIG. 9B, in addition to lines included in the pattern illustrated in FIG. 9A, new lines exist on the upper left and right sides. That is, new lines denoting flaws are added to original pattern lines on the surface of the product 12.

In an identification verification method in the related art, if a pattern on the surface of an inspection target product is changed due to damage to the inspection target product, it is determined that the inspection target product is different from a verification product even if they are the same. Thus, it is difficult to correctly perform the identification and verification of the inspection target product. In order to perform the identification and verification of the inspection target product with certainty, it is necessary to fix a protection member on the surface of the inspection target product so as to prevent the pattern change.

In contrast to this, the identification verification apparatus 11 extracts an input pattern from a captured image by performing the generalized Hough transform process, and determines that an inspection target product is the same as a verification product when an identification pattern is the same as the input pattern or is included in the input pattern.

In general, the generalized Hough transform is performed so as to calculate a transformation parameter such as the amount of translational motion from a figure drawn with a line to another figure drawn with a line or the scaling factor between these figures, and can be considered to be a kind of multiple linear regression analysis. In the generalized Hough transform, voting is performed upon transformation parameters (candidates) on the basis of the invariant of a predetermined pattern. A transformation parameter assumed to be a correct transformation parameter can be selected from among the transformation parameters (candidates) on the basis of the number of votes obtained. Furthermore, on the basis of the number of votes obtained of the transformation parameter assumed to be a correct transformation parameter, a similarity level is calculated. It is determined whether the calculated similarity level excesses a threshold value. On the basis of the determination result, the identification and verification of a product can be performed using the generalized Hough transform.

As described previously, in the generalized Hough transform, the calculation of a transformation parameter can be considered to be a kind of multiple linear regression analysis. Accordingly, even if the pattern of the product 12 is slightly changed, it is obvious that the most reliable transformation parameter denoting the relationship between an identification pattern and an input pattern can be obtained by performing the generalized Hough transform. That is, the pattern change produces little effect on the calculation result.

A case in which the level of damage caused by flaws or contaminations is reduced as time passes rarely occurs in reality. Accordingly, when the level of damage (the number of core lines denoting a pattern) is reduced as time passes, it is difficult to determine that an inspection target product is the same as a verification product even if the similarity level between them is very high.

That is, if the identification pattern is included in the input pattern, it can be determined that the same product has been damaged. If the identification pattern is not included in the input pattern, it can be determined that an inspection target product is different from a verification product. Accordingly, the identification of a damaged product can be easily and accurately performed by making the sizes of an input pattern and an identification pattern uniform using a transformation parameter obtained by the generalized Hough transform and superimposing them. Thus, if an input pattern and an identification pattern are superimposed, it is determined that an inspection target product is the same as a verification product only when the identification pattern is included in the input pattern.

By using the above-described method of determining that an inspection target product is the same as a verification product when an identification pattern is included in an input pattern, it is unnecessary to fix a protection member on the surface of the product 12 so as to prevent the pattern change and prepare a special image pickup apparatus. Accordingly, the identification and verification of an inspection target product can be easily performed. Furthermore, the identification verification apparatus 11 can be more widely used.

The generalized Hough transform process performed in step S73 illustrated in FIG. 8 will be described with reference to a flowchart illustrated in FIG. 10. As an example of the generalized Hough transform, similarity transformation will be described with reference to the flowchart illustrated in FIG. 10. The generalized Hough transform process is performed for each identification pattern image recorded in the recording unit 23.

In step S121, the comparison unit 24 prepares an array that is an object of voting and initializes the number of votes of each element included in the array to zero.

For example, this array is a two-dimensional array with dimensions corresponding to a scale and a rotation angle. The scale and the rotation angle function as a transformation parameter. The scale is the size ratio between an identification pattern and an input pattern, that is, a scaling factor used to enlarge or reduce the identification pattern in size. The rotation angle is a relative rotation angle by which the identification pattern is rotated with respect to the input pattern, that is, an angle used to rotate the identification pattern so that the identification pattern and the input pattern incline at the same angle. A single element on the two-dimensional array is specified on the basis of the scale and the rotation angle which function as a transformation parameter. In the generalized Hough transform process, by voting for elements each of which is specified on the basis of a transformation parameter, likely transformation parameters are obtained.

It is necessary to change the number of divisions of the array that is an object of voting, that is, the range of values of the scale or the rotation angle, in accordance with the desired precision of a transformation parameter. For example, since the rotation angle ranges from 0 to 360 degrees, the number of divisions of the array is set to 360. As a result, the rotation angle can be obtained with a precision of 1 degree. On the other hand, for example, since the scale ranges from 0 to an infinite value, it is necessary to set the upper and lower limits of the scale and divide the range between the upper and lower limits into an appropriate number of segments so as to achieve the desired precision of the scale. For example, the range of the scale is set to the range of 0 to 3, and the range is divided into 300 segments. As a result, the scale can be obtained with a precision of 1 percent in the range of 0 to 3.

If the array that is an object of voting is prepared, in step S122, the comparison unit 24 performs a hash table generation process. The hash table generation process will be described later. In the hash table generation process, the comparison unit 24 generates a hash table used for voting.

Figure 11:
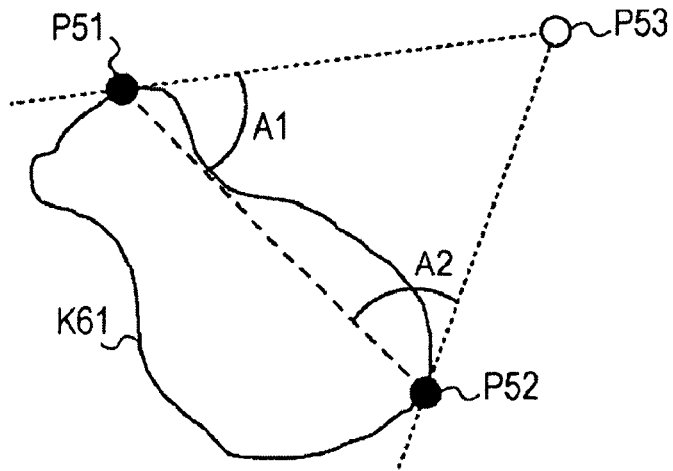
FIG. 11 is a diagram describing a chord.

For example, it is assumed that an input pattern on an input pattern image supplied from the extraction unit 22 to the comparison unit 24 is a pattern illustrated in FIG. 11. In FIG. 11, a curve K61 is a core line denoting the input pattern.

Upon receiving an input pattern image including the input pattern denoted by the curve K61, the comparison unit 24 selects any points on the input pattern, that is, points P51 and P52, and sets a line segment P51P52 joining the points P51 and P52 as a chord. Subsequently, the comparison unit 24 calculates the length of the chord (chord length). Furthermore, the comparison unit 24 calculates tangents to the core line at both ends of the chord and sets the intersection point of the tangents as a point P53. In an example illustrated in FIG. 11, an intersection point of tangents to the core line of the input pattern at the points P51 and P52 is set as the point P53.

Furthermore, an angle formed by a line P51P53 joining the points P51 and P53 and the line P51P52 joining the points P51 and P52 is defined as an angle A1, and an angle formed by a line P52P53 joining the points P52 and P53 and the line P51P52 joining the points P51 and P52 is defined as an angle A2. The angles A1 and A2 that are interior angles of a triangle having the points P51, P52, and P53 as vertices are invariants for the similarity transformation of the triangle. Accordingly, the comparison unit 24 generates a hash key on the basis of these angles. The hash key is a value that is calculated for each chord using invariants, and the detailed description thereof will be made later.

The comparison unit 24 sets the chord length and the angles A1 and A2 as the feature values of the chord that is the line segment joining the points P51 and P52, and generates a hash table in which the hash key and the feature values are arranged (registered). The comparison unit 24 calculates a hash key and feature values for all combinations of any points on the core line of the input pattern, associates the calculated hash key and the calculated feature values with a corresponding combination of any points, and registers them in the hash table.

Figure 10:
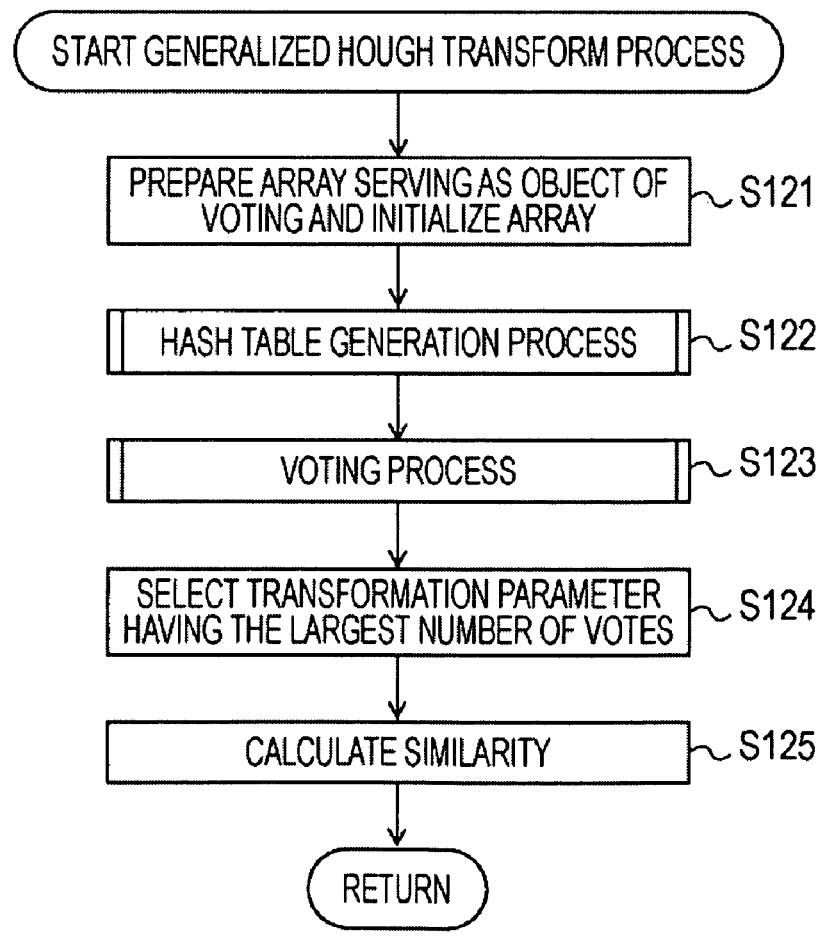
FIG. 10 is a flowchart describing a generalized Hough transform process.

Referring back to the flowchart illustrated in FIG. 10, in step S123, the comparison unit 24 performs a voting process so as to vote for elements included in the prepared array. The voting process will be described in detail later. In this voting process, the comparison unit 24 selects any two points on the core line of an identification pattern, and calculates a hash key and feature values of a chord joining the two points as in the case of the input pattern. Subsequently, the comparison unit 24 obtains from the hash table feature values associated with a hash key having the same value as the calculated hash key, and calculates a transformation parameter composed of a chord scale and a chord rotation angle using the obtained feature values of the input pattern and the calculated feature values of the identification pattern.

The transformation parameter can be regarded as a parameter used to transform the chord of an identification pattern into the chord of an input pattern. Subsequently, the comparison unit 24 casts only one vote for an element that is specified on the basis of the calculated scale and the calculated rotation angle which function as a transformation parameter. That is, the comparison unit 24 adds one to the value of the element. The comparison unit 24 calculates a transformation parameter for each of all combinations of any points on the core line of the identification pattern, and casts one vote for an element that is specified on the basis of the calculated transformation parameter. Accordingly, if the number of pixels included in the identification pattern is N pixels, the total number of votes becomes $_NC_2 (=N!/(2 \times (N-2)!))$ votes. The symbol N! denotes the factorial of N.

In step S124, the comparison unit 24 selects an element having the largest number of votes obtained from the voted elements included in the array, and sets a transformation parameter corresponding to the selected element as a transformation parameter for the corresponding identification pattern image. For example, after voting has been performed, if an element having the scale of 1 and the rotation angle of 30 degrees has the largest number of votes, the comparison unit 24 sets the scale of 1 and the rotation angle of 30 degrees as the transformation parameter of a corresponding identification pattern image. Thus, the comparison unit 24 calculates the transformation parameter of each identification pattern image.

In step S125, the comparison unit 24 calculates the similarity level of the selected transformation parameter (identification pattern image) on the basis of the number of votes obtained of the element corresponding to the selected transformation parameter. Subsequently, the process proceeds to step S74 illustrated in FIG. 8, and the generalized Hough transform process ends.

The generalized Hough transform process is performed for each identification pattern image recorded in the recording unit 23. Since the sizes of identification patterns of the identification pattern images recorded in the recording unit 23 are different from each other, the total number of votes for elements varies from identification pattern image to identification pattern image. For example, if an identification pattern is composed of N pixels, the total number of votes is $_NC_2$. Accordingly, if the number of votes obtained of the transformation parameter of each identification pattern image is set as a similarity level, it is difficult to accurately determine which of identification patterns is most similar to an input pattern on the basis of the similarity level of each identification pattern image.

By multiplying the number of votes obtained of each element by $1/(_NC_2)$ so as to obtain the weight of a single vote, a voting result that is independent of the size of an identification pattern can be obtained. That is, by multiplying the number of votes obtained of an element denoting the selected transformation parameter by $1/(_NC_2)$ and setting the calculation result as a similarity level, the identification pattern of each identification pattern image can be more accurately compared with an input pattern using a similarity level.

Accordingly, the comparison unit 24 multiplies the number of votes obtained of an element denoting the selected transformation parameter by $1/({}_N C_2)$, and sets the calculation result as the similarity level of the transformation parameter.

Thus, the comparison unit 24 calculates the transformation parameter of each identification pattern image and the similarity level of the transformation parameter. Using the calculated similarity level, each identification pattern and an input pattern, that is, each verification product and an inspection target product, can be easily and accurately compared with each other.

Figure 12:
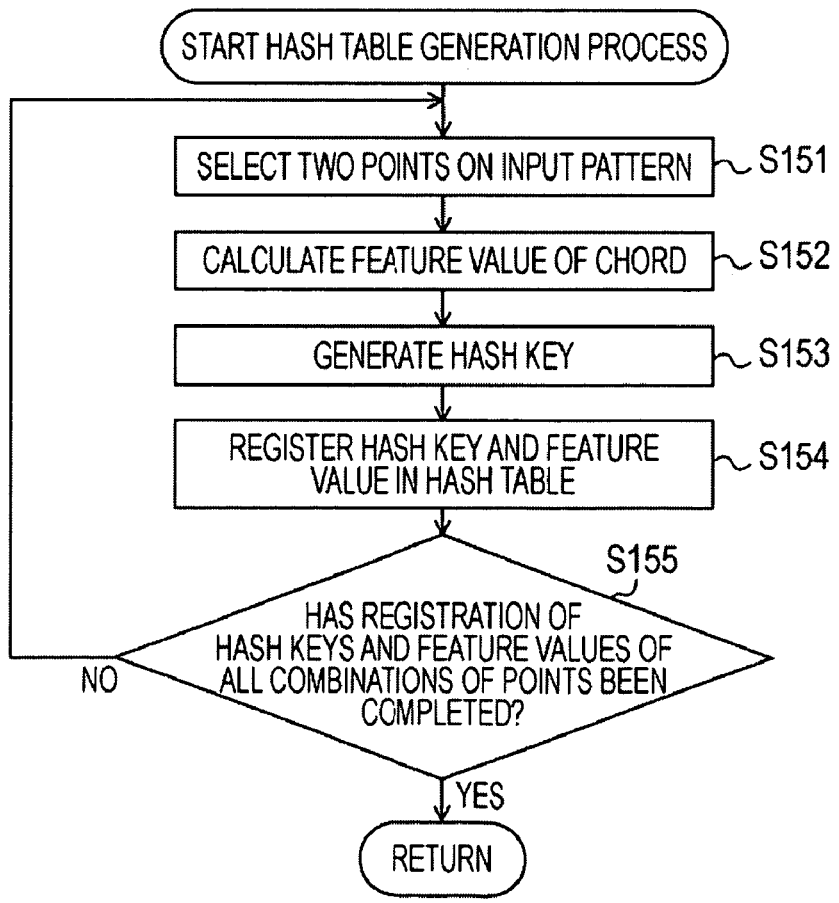
FIG. 12 is a flowchart describing a hash table generation process.

Next, the hash table generation process performed in step S122 illustrated in FIG. 10 will be described with reference to a flowchart illustrated in FIG. 12.

In step S151, the comparison unit 24 selects two points on the input pattern of an input pattern image supplied from the extraction unit 22. For example, the comparison unit 24 receives the input pattern image illustrated in FIG. 11 and selects the points P51 and P52.

In step S152, the comparison unit 24 sets a line segment joining the selected two points as a chord and calculates the feature values of the chord. For example, if the points P51 and P52 illustrated in FIG. 11 are selected, the comparison unit 24 calculates as feature values the chord length that is the length of the line segment (chord) joining the points P51 and P52 and the angles A1 and A2 that are interior angles of a triangle having the points P51, P52, and P53 as vertices. More specifically, the comparison unit 24 also calculates a vector from a point (for example, the point P51) at one end of the chord to a point (for example, the point P52) at the other end of the chord as a feature value.

In step S153, the comparison unit 24 generates a hash key of the chord joining the selected two points. For example, if a rotation angle is calculated with an integer precision of 1 degree, the comparison unit 24 calculates a hash key by solving the following equation 9 using the angles A1 and A2 that have been calculated as feature values.

$$H = A1 \times 360 + A2 \qquad (9)$$

In equation 9, H denotes the value of a hash key. The value of a hash key is unique to the combination of two points on an input pattern. That is, a case in which a plurality of combinations of two points on an input pattern have the same hash key rarely occurs. A hash key is not limited to the hash key denoted by equation 9, and may be any hash key that is calculated on the basis of an invariant for similarity transformation.

In step S154, the comparison unit 24 registers the calculated hash key and the calculated feature values in a hash table. That is, in the hash table, hash keys are each associated with corresponding feature values and are arranged in a predetermined order, for example, in ascending numerical order of hash key. The comparison unit 24 associates the calculated hash key with the calculated feature values and inserts them between rows of a hash key and feature values which are arranged in a predetermined order, thereby updating the hash table.

In step S155, the comparison unit 24 determines whether the calculation of a hash key and feature values has been performed for all combinations of points on the input pattern and the calculated hash keys and the calculated feature values have been registered in the hash table. For example, if a core line of an input pattern is composed of M pixels, the total number of combinations of any two points (two pixels) on the input pattern becomes ${}_M C_2$ combinations. If the hash keys and the feature values of all the combinations are registered in the hash table, the comparison unit 24 determines that the registration has been completed.

If it is determined in step S155 that the hash keys and feature values of all the combinations have not yet been registered, the process returns to step S151. In step S151, next two points that has yet to be selected are selected.

On the other hand, if it is determined in step S155 that the hash keys and feature values of all the combinations have been registered, the process proceeds to step S123 illustrated in FIG. 10 and the hash table generation process ends.

Thus, the comparison unit 24 generates a hash table. Using the generated hash table, a transformation parameter can be easily calculated.

Figure 13:
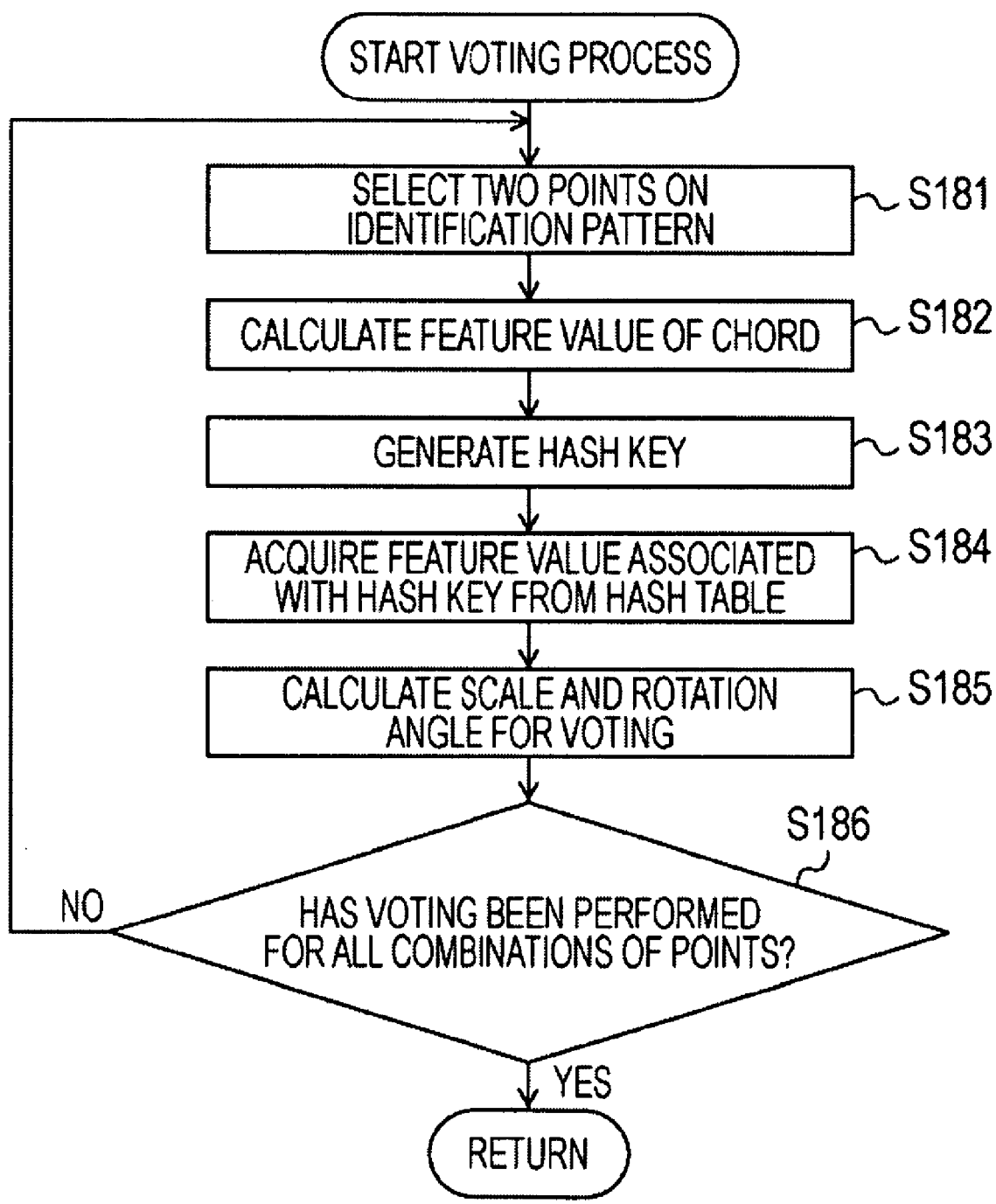
FIG. 13 is a flowchart describing a voting process.

After the hash table has been generated, using the generated hash table, the voting process of voting for elements included in the prepared array is performed. The voting process performed in step S123 illustrated in FIG. 10 will be described with reference to a flowchart illustrated in FIG. 13. This voting process is performed for each identification pattern image recorded in the recording unit 23, that is, each verification product.

In step S181, the comparison unit 24 obtains an identification pattern image recorded in the recording unit 23 and selects two points on the identification pattern of the identification pattern image.

In step S182, the comparison unit 24 sets a line segment joining the selected two points as a chord and calculates the feature values of the chord. That is, like the processing of step S152 illustrated in FIG. 12, the comparison unit 24 calculates an angle formed by the chord and a tangent to the core line at one end of the chord (interior angle of a triangle), an angle formed by the chord and a tangent to the core line at the other end of the chord (interior angle of a triangle), and the length of the chord as feature values. More specifically, the comparison unit 24 also calculates a direction vector from one end of the chord to the other end of the chord as a feature value.

In step S183, the comparison unit 24 generates a hash key using the interior angles calculated as the feature values. For example, the comparison unit 24 calculates a hash key using equation 9.

In step S184, the comparison unit 24 obtains from the hash table feature values associates with the generated hash key. That is, the comparison unit 24 selects a hash key having the same value as the generated hash key from among hash keys registered in the hash table, and obtains feature values associated with the selected hash key. As a result, feature values associated with a hash key having the same value as the hash key generated in step S183 are obtained.

In step S185, the comparison unit 24 calculates a chord scale and a chord rotation angle using the feature values calculated in step S182 and the feature values selected from the hash table and performs voting.

For example, the comparison unit 24 calculates a scale functioning as a transformation parameter by solving the following equation 10 where CHORD(r) denotes the chord length of the identification pattern which is calculated as a feature value and CHORD(t) denotes the chord length of the input pattern which is obtained as a feature value.

$$\text{Scale} = |\text{CHORD}(t)|/|\text{CHORD}(r)| \qquad (10)$$

In equation 10, |CHORD(t)| and |CHORD(r)| denote the absolute values of CHORD(t) and CHORD(r), respectively. Accordingly, the scale can be obtained by dividing the absolute value of the chord length of the input pattern by the absolute value of the chord length of the identification pattern.

Furthermore, the comparison unit 24 calculates a rotation angle functioning as the transformation parameter by solving the following equation 11 where (CHORD(r)X, CHORD(r)

Y) denotes the direction vector of the chord of the identification pattern which is obtained as a feature value, that is, a vector from one end of the chord to the other end of the chord, and (CHORD(t)X,CHORD(t)Y) denotes the direction chord of the chord of the input pattern which is obtained as a feature value.

$$\text{Angle} = \arctan\left(\frac{\text{CHORD}(t)Y}{\text{CHORD}(t)X}\right) - \arctan\left(\frac{\text{CHORD}(r)Y}{\text{CHORD}(r)X}\right) \quad (11)$$

In equation 11, arctan(A) denotes an arc tangent. Accordingly, the rotation angle can be obtained by subtracting the inclination angle (rotation angle) of the chord of the identification pattern from the inclination angle of the chord of the input pattern. The inclination angle (rotation angle) denotes an angle at which the chord inclines in a reference direction, that is, an angle at which the line passing through points at both ends of the chord inclines in a predetermined coordinate system.

After calculating the scale and the rotation angle as a transformation parameter, the comparison unit 24 votes for a corresponding element included in the prepared array. That is, the comparison unit 24 adds one to the value of an element included in the array which is specified on the basis of the calculated scale and the calculated rotation angle.

In the hash table, if a plurality of feature values are associated with the hash key having the same value as the hash key of the chord of the identification pattern, the comparison unit 24 calculates a transformation parameter of each of the feature values and performs voting on the basis of the calculated transformation parameter.

In step S186, the comparison unit 24 determines whether the transformation parameter of each of all the combinations of points on the identification pattern has been calculated and voting has been performed on the basis of the calculated parameter. For example, if the core line of the identification pattern is composed of N pixels, the number of combinations of any two points (two pixels) on the identification pattern is $_NC_2$. The comparison unit 24 determines whether voting has been performed for all the combination.

If it is determined in step S186 that voting has not yet been performed for all the combinations, the process returns to step S181. In step S181, next two points that has yet to be selected are selected.

On the other hand, if it is determined in step S186 that voting has been performed for all the combinations, the process proceeds to step S124 illustrated in FIG. 10 and the voting process ends.

As described previously, the comparison unit 24 selects any two points on an identification pattern so as to generate a chord, calculates the transformation parameter of the generated chord, and performs voting on the basis of the calculated transformation parameter. Thus, by calculating the transformation parameter of each chord and performing voting on the basis of the calculated transformation parameter, a more likely transformation parameter of the identification pattern (identification pattern image) can be obtained.

In the voting process, two points on an identification pattern are selected so as to generate a chord (hereinafter referred to as an identification chord), and feature values associated with a hash key having the same value as the hash key of the identification chord are obtained from a hash table. The feature values obtained from the hash table are the feature values of the chord of an input pattern (hereinafter referred to as an input chord), and the input chord is one of the cords of the input pattern which has a hash key of the same value as the hash key of the identification chord. Accordingly, the identification chord and the input chord correspond to one side of a triangle and one side of another triangle. These triangles (for example, triangles having the points P51, P52, and P52 as vertices illustrated in FIG. 11) are similar to each other.

If an identification pattern and an input pattern are the same when the hash keys of an identification chord and an input chord are the same, there is a high possibility that points on the input pattern corresponding to points at both ends of the identification chord, that is, points on the input pattern which are located at the same positions as the points at both ends of the identification chord, are points at both ends of the input chord. That is, the points at both ends of the identification chord and the points at both ends of the input chord are the same points on the same pattern.

Accordingly, if a transformation parameter for transforming an identification chord into an input chord is calculated on the basis of such a combination of an identification chord and an input chord, there is a high possibility that the calculated transformation parameter is a transformation parameter for transforming an identification pattern into an input pattern. Furthermore, the transformation parameter of each identification chord which is denoted by the element having the largest number of votes obtained in an array can be considered to be a correct transformation parameter for transforming the identification pattern into the input pattern. Thus, by setting the transformation parameter denoted by the element having the largest number of votes obtained as a transformation parameter used to transform an identification pattern, a more likely transformation parameter can be obtained.

A case has been described in which a hash tale is generated using an input pattern, the transformation parameter of each chord of an identification pattern is calculated using the hash table, and voting is performed on the basis of the calculated transformation parameter. However, the hash table may be generated using an identification pattern, the transformation parameter of each chord of an input pattern may be calculated using the generated hash table, and voting may be performed using the calculated transformation parameter.

In the above-described example, identification pattern images recorded in advance are used. However, an identification pattern image may be generated from a captured image recorded in advance at the time of the identification and verification of the product 12, and the generated identification pattern image may be used.

If the core line of an input pattern is composed of M pixels and the core line of an identification pattern is composed of N pixels, $(_MC_2 +_NC_2)$ cords are generated so as to calculate the transformation parameter of a single identification pattern image. Accordingly, if the size of an input pattern or an identification pattern is large, it takes enormous amounts of time to calculate a transformation parameter.

In order to reduce the amount of computation of a transformation parameter, the predetermined number of pixels (points) may be selected in a pattern included in an input pattern image or an identification pattern image and voting may be performed using the selected pixels. In this case, it is desirable that the selected pixels be arranged at regular intervals.

However, if pixels arranged at regular intervals are selected, for example, a voting error may occur. The reason for this is that, as illustrated in FIG. 14, there are pixels having tangents in different directions even if these pixels are placed at approximately the same position.

Figure 14:
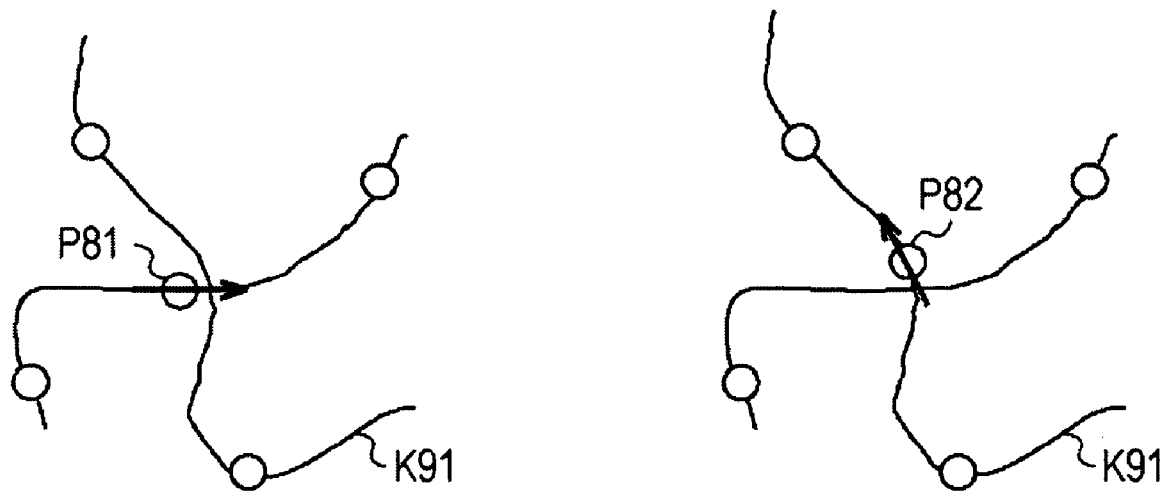
FIG. 14 is a diagram describing a phenomenon in which the direction of a tangent varies in accordance with the position of a core line.

For example, as illustrated in the left-side drawing in FIG. 14, on a core line K91 of an identification pattern, if a point P81 in a portion extending in the horizontal direction is selected, a tangent to the core line K91 at the point P81 extends in the horizontal direction as illustrated by an arrow in the drawing.

On the other hand, as illustrated in the right-side drawing in FIG. 14, on the core line K91 of the identification pattern, if a point P82 in a portion extending in the vertical direction is selected, a tangent to the core line K91 at the point P82 extends in the vertical direction as illustrated by an arrow in the drawing.

Thus, although the points P81 and P82 are close to each other, the directions of the tangents at the points P81 and P82 are different from each other. Accordingly, for example, if a point corresponding to the point P81 is selected in an input pattern and the point P82 is selected in the identification pattern, a voting error occurs. That is, a vote is cast for an element different from an element denoting a correct transformation parameter. Thus, a correct transformation parameter may not be obtained.

In order to overcome the above-described difficulty, using a method used for the extraction of an image feature point, pixels (points) on a pattern, which are to be used for voting, may be selected in descending order of feature value. As a feature value used for the selection of pixels, for example, a feature value used in a Harris corner detector can be used.

In this case, pixels (n pixels) that are near an observation pixel (point) on a pattern and are in a circle with a radius R are used to calculate the feature value of the observation pixel, and one of the pixels having the largest feature value is selected. The feature value (response) is obtained by solving the following equation 12.

$$\text{response} = det(Cov) - k \times trace^2(Cov) \qquad (12)$$

In equation 12, k denotes a constant varying from 0.04 to 0.15, and Cov is denoted by the following equation 13.

$$Cov = \sum_{i=1}^{n} \begin{bmatrix} Iix Iix & Iix Iiy \\ Iix Iiy & Iiy Iiy \end{bmatrix} \qquad (13)$$

In equation 13, Iix denotes a derivative value of an ith pixel in an x direction (horizontal direction) in a circle on an identification pattern image (or input pattern image), that is, the difference between the values of the ith pixel and a pixel adjacent to the ith pixel in the x direction. Furthermore, in equation 13, Iiy denotes a derivative value of an ith pixel in a y direction (vertical direction) perpendicular to the x direction in the circle, that is, the difference between the values of the ith pixel and a pixel adjacent to the ith pixel in the y direction. Sill furthermore, in equation 13, Σ denotes the summation of matrix elements (Iix×Iix, Iix×Iiy, Iiy×Iiy) with a variable i varied from 1 to n.

In equation 12, det(Cov) denotes the determinant of a matrix Cov, and trace²(Cov) denotes the square of the trace of the matrix Cov, that is, the square of the sum of diagonal elements of the matrix Cov. A feature value calculated from equation 12 becomes larger as the number of adjacent core lines increases. This facilitates the selection of a pixel at a point at which a core line is divided.

The comparison unit 24 calculates a feature value for all pixels on a pattern using equation 12, and generates a list of pixels (points) that are listed in descending order of feature value. Subsequently, the comparison unit 24 sequentially checks the pixels from the pixel at the top of the list so as to determine whether a pixel near the observation pixel is selected. If a pixel near the observation pixel has not yet been selected, the comparison unit 24 selects the pixel near the observation pixel. As a result, pixels spaced at substantially regular intervals can be selected in descending order of feature value. The number of pixels to be selected is determined in accordance with the number of pixels to be selected near an observation pixel.

Figure 15:
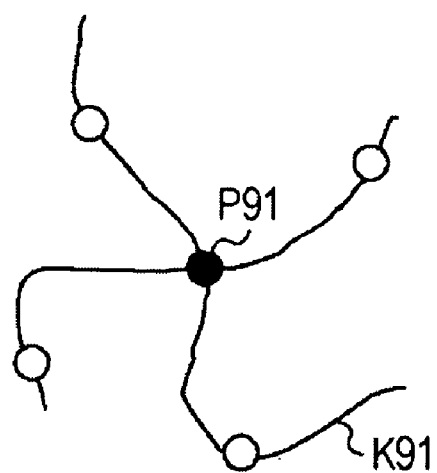
FIG. 15 is a diagram describing the selection of a pixel on a core line using a feature value.

Thus, pixels are selected in descending order of feature value. This facilitates the selection of a point at which a core line is divided. Accordingly, for example, a point P91 illustrated in FIG. 15 at which the core line K91 is divided is given higher priority for selection than the points P81 and P82 illustrated in FIG. 14. Consequently, the occurrence of a voting error can be prevented, and a correct transformation parameter can be obtained with more certainty. If a point at which the core line K91 is divided is selected, a plurality of tangents are obtained. By performing voting using each of these tangents, correct voting can be achieved.

Figure 16:
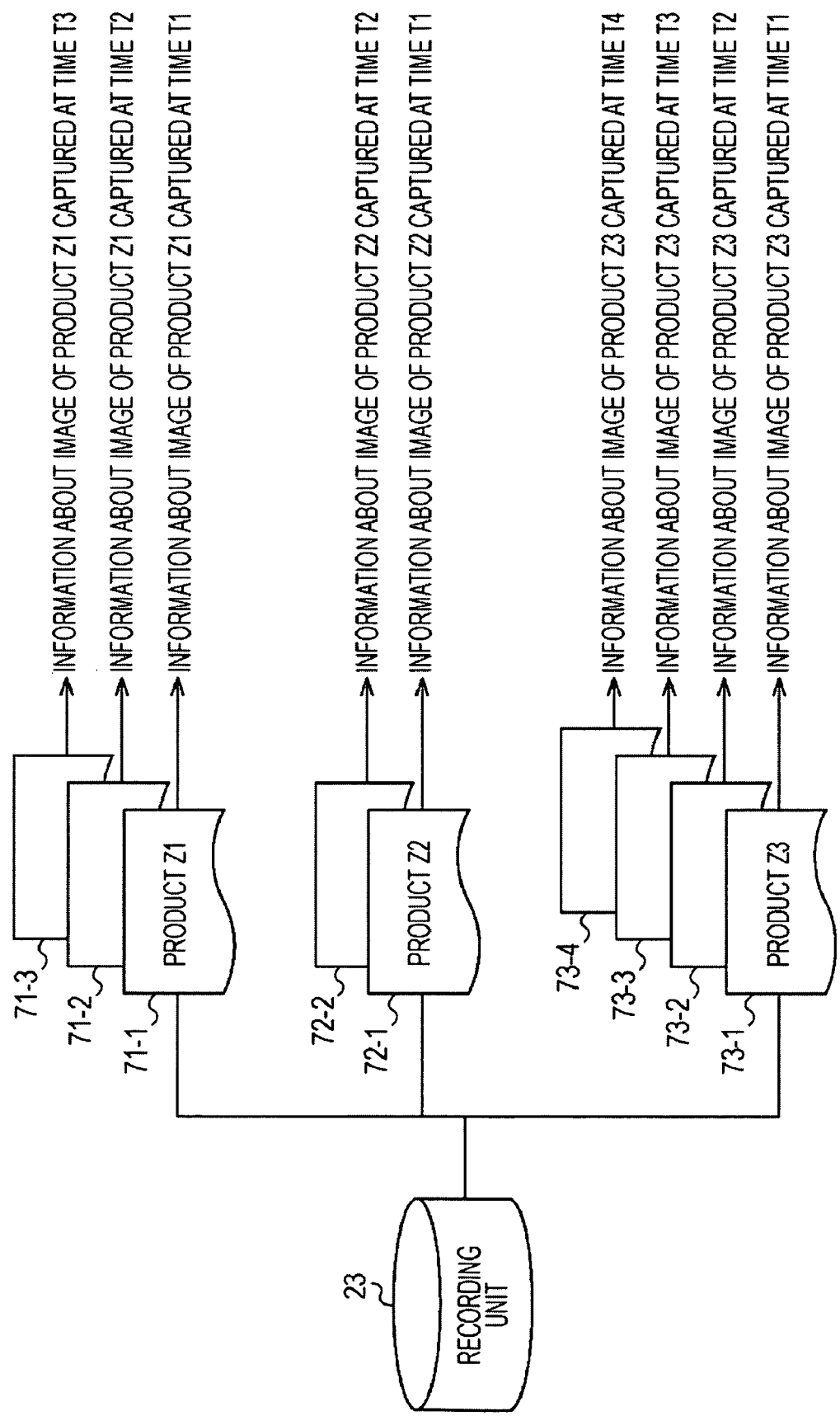
FIG. 16 is a diagram describing the management of captured images arranged in chronological order.

As illustrated in FIG. 16, in the recording unit 23, captured images or identification pattern images may be arranged in chronological order for the purpose of information management.

In an example illustrated in FIG. 16, the recording unit 23 records pieces of information 71-1 to 71-3 about images of a product Z1 captured at times t1 to t3. For example, the information 71-1 includes the captured image of the product Z1, an identification pattern image generated from the captured image, and information about the image capturing time (date and time) of the captured image.

The recording unit 23 also records pieces of information 72-1 and 72-2 about images of a product Z2 captured at times t1 and t2, and pieces of information 73-1 and 73-4 about images of a product Z3 captured at times t1 to t4.

Thus, the images of a single product captured at various times, identification pattern images generated from the captured images, and pieces of information about the image capturing times of the captured images are recorded. Accordingly, in a case that the product 12, which is an inspection target product, is specified as a predetermined product using an input pattern, by detecting the image capturing times of the captured images recorded in the recording unit 23 and the increase in the number of flaws (patterns) from one of the captured images to the next one of the captured images, information about a period of time during which the image of the input pattern has been captured can be obtained.

In this case, for example, when an identification verification result is displayed on the output unit 25, information indicating whether the number of flaws (core lines of a pattern) on the surface of the product 12 has been increased, the image of the pattern, and information about an estimated period of time during which the image of the input pattern has been captured may be displayed.

For example, by causing the comparison unit 24 to calculate the difference between identification pattern images that have been captured at different times, the increase in the number of flaws of the product can be detected. That is, the difference between each pixel included in an identification pattern image captured at a predetermined image capturing time and a corresponding pixel included in another identification pattern image captured at another image capturing time is calculated, and identification patterns obtained at these image capturing times are compared with each other. If the number of core lines of the identification pattern increases as time passes, it is determined that the number of flaws is increased.

As an example of the generalized Hough transform, similarity transformation has been described. However, affine transformation or projective transformation may be performed.

Figures 17, 18:
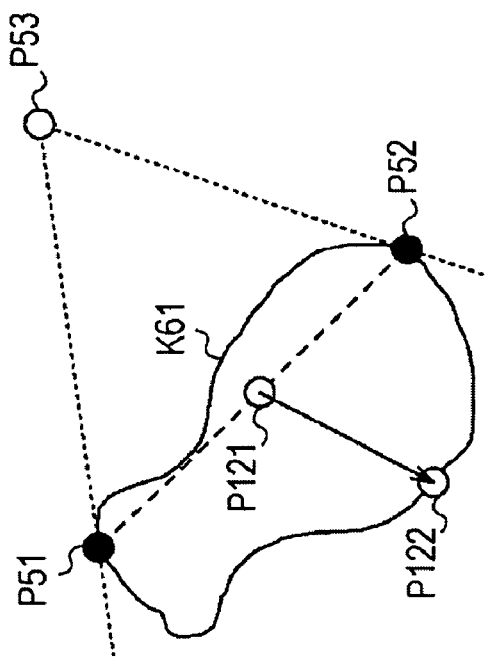
FIG. 17 is a diagram illustrating examples of the generalized Hough transform.
FIG. 18 is a diagram describing voting performed using a check point.

For example, as illustrated in FIG. 17, in a case that a transformation parameter is calculated by performing similarity transformation, for example, three points A, B, and C are obtained in each input pattern image or each identification pattern image. A triangle having the points A, B, and C as vertices is formed and the ratio between the side AC and the side AB of the triangle or each interior angle of the triangle is used as an invariant. Using the invariant, a transformation parameter is calculated.

Furthermore, as illustrated in FIG. 17, in a case that a transformation parameter is calculated by performing affine transformation, for example, four points A, B, C, and D are obtained in each input pattern image or each identification pattern image. A triangle having the points A, D, and C as vertices and a triangle having the points A, B, and C as vertices are formed and the ratio between the areas of the triangles is used as an invariant. Using the invariant, a transformation parameter is calculated.

Still furthermore, as illustrated in FIG. 17, in a case that a transformation parameter is calculated by performing projective transformation, for example, five points A, B, C, D, and E are obtained in each input pattern image or each identification pattern image. A triangle having the points A, B, and D as vertices, a triangle having the points A, C, and E as vertices, a triangle having the points A, C, and D as vertices, and a triangle having the points A, B, and E as vertices are formed, and a value (cross ratio) obtained by dividing the ratio between the areas of the triangle having the points A, B, and D as vertices and the triangle having the points A, C, and E as vertices by the ratio between the areas of the triangle having the points A, C, and D as vertices and the triangle having the points A, B, and E as vertices is used as an invariant. Using the invariant, a transformation parameter is calculated.

Thus, not only similarity transformation but also advanced types of the generalized Hough transforms such as affine transformation and projective transformation can be used to calculate a transformation parameter. Accordingly, an image capturing direction and an image capturing distance are not particularly limited at the time of capturing the image of the product 12. Since the brightness of a captured image is made uniform when a pattern is extracted from the captured image, a lighting environment is not particularly limited at the time of capturing the image of the product 12. Accordingly, the identification and verification of the product 12 can be easily performed using the captured image of the product 12, and the applicability of the identification verification apparatus 11 can be expanded.

If the image capturing conditions of verification product images captured at different times, which are recorded in the recording unit 23, are the same, there is no disparity in the value of one vote between these captured images when voting for elements included in an array is performed. Accordingly, by selecting a transformation parameter having the largest number of votes in an identification pattern image captured at each image capturing time and comparing the numbers of votes obtained of these selected transformation parameters, the increase in the number of flaws on the surface of the product can be determined (detected).

For example, as illustrated in FIG. 18, in each chord of an input pattern image, a vector from a midpoint P121 of the chord to a check point P122 randomly selected on the core line K61 is obtained as a check vector. The check vector is registered in a hash table along with a hash key and feature values. Referring to FIG. 18, the same reference numerals are used to identify parts already described with reference to FIG. 11, and the descriptions thereof will be therefore omitted as appropriate.

Referring to FIG. 18, in a lower-left portion on the core line K61 of an input pattern, the check point P122 is set. The check vector is registered in the hash table in association with a corresponding hash key.

At the time of voting, the comparison unit 24 obtains from the hash table feature values and a check vector associated with a hash key having the same value as the hash key of an identification pattern, and transforms the identification pattern and the chord of the identification pattern using an obtained transformation parameter. Furthermore, the comparison unit 24 votes for an element in an array which is specified by the obtained parameter only when the identification pattern exists at a position obtained by adding the check vector to the midpoint of the transformed chord, that is, at a distance denoted by the check vector from the midpoint in a direction denoted by the check vector (only when the moved position is the position of a pixel on the identification pattern). If the position obtained by adding the check vector to the midpoint of the transformed chord is not the position of a pixel on the core line of the identification pattern, the comparison unit 24 does not perform voting so as to prevent the occurrence of a voting error.

The point P122 is a point (pixel) on the pattern. Accordingly, if the points at both ends of the chord of an identification pattern and the points at both ends of the chord of an input pattern are identical with each other on the same pattern, the position obtained by adding the check vector to the midpoint of the chord of the transformed identification pattern becomes the position of a point (pixel) on the core line of the identification pattern. Thus, using a check point, the occurrence of a voting error can be significantly reduced. A method using a check point is called a high-speed generalized Hough transform method.

As described previously, the comparison unit 24 performs the voting process for each of identification pattern images captured at various times using a check point.

If the pattern of a product is not a simple pattern in which the same shape is repeated, the voting error rarely occurs. Accordingly, by comparing the voting results of identification pattern images captured at various times, the increase in the number of flaws of the product can be determined.

That is, even if the number of flaws on the surface of the product is increased, the identification pattern is included in the input pattern without fail. Accordingly, if the number of flaws is not increased (that is, the number of voting errors is small), the number of votes obtained of the transformation parameter having the largest number of votes obtained remains large.

On the other hand, if the number of flaws on the surface of the product is increased, the number of voting errors, that is, the number of times voting is not performed so as to prevent the occurrence of a voting error, is increased. As a result, the number of votes obtained of the transformation parameter having the largest number of votes obtained is reduced. Accordingly, by comparing the results of voting performed with identification pattern images captured at various times, that is, the numbers of votes obtained of transformation parameters having the largest number of votes obtained, the increase in the number of flaws on the surface of a product can be determined (detected).

In this case, if the number of votes obtained of a transformation parameter of an identification pattern image captured at a predetermined time is larger than that of a transformation parameter of an identification pattern image captured at a time after the predetermined time, the comparison unit 24 determines that the number of flaws on the surface of the product has been increased.

Furthermore, the identification and verification of an inspection target product may be performed on the basis of the percentage of the occurrence of the voting error determined using a check point, that is, the percentage of the number of times voting has not been performed so as to, prevent the occurrence of the voting error to the total number of times voting should be performed. In this case, a verification product corresponding to a transformation parameter having the smallest percentage of the number of times voting has not been performed so as to prevent the occurrence of the voting error is determined to be identical with the inspection target product. The reason for this is that the percentage of the occurrence of the voting error determined with a check point decreases when an identification pattern is included in an input pattern, and, in contrast, the percentage of the occurrence of the voting error determined with the check point increases when the input pattern is different from the identification pattern.

In the above-described example, units used for the identification and verification of the product 12 are included in the identification verification apparatus 11. However, these units may be included in different apparatuses.

In this case, for example, as illustrated in FIG. 19, a block used for the identification and verification of the product 12 is included in each of a client 102 and a server 103 which are connected to each other via a communication network 101 such as the Internet.

That is, the client 102 includes the observation unit 21, the output unit 25, a control unit 111, and a communication unit 112. The server 103 includes the extraction unit 22, the recording unit 23, the comparison unit 24, and the communication unit 113. In FIG. 19, the same reference numerals are used to identify parts described with reference to FIG. 1, and the descriptions thereof will be omitted.

The control unit 111 included in the client 102 controls the entire operation of the client 102. For example, the control unit 111 obtains a captured image and information about the image capturing date and time of the captured image from the observation unit 21, and supplies them to the communication unit 112. Furthermore, the control unit 111 receives the result of the identification and verification of the product 12 from the communication unit 112 and supplies the result to the output unit 25 so as to cause the output unit 25 to display the result. The communication unit 112 transmits a captured image supplied from the control unit 111 to the server 103 via the communication network 101. Furthermore, the communication unit 112 receives an identification verification result from the server 103 and supplies the result to the control unit 111.

The communication unit 113 included in the server 103 receives a captured image transmitted from the client 102 via the communication network 101 and supplies the received captured image to the extraction unit 22. Furthermore, the communication unit 113 transmits an identification verification result supplied from the comparison unit 24 to the client 102.

For example, in order to record the captured image of the product 12, which is an inspection target product, in the server 103, the observation unit 21 included in the client 102 captures the image of the product 12. The control unit 111 obtains from the observation unit 21 the captured image and information about the image capturing date and time of the captured image and supplies them to the communication unit 112. The communication unit 112 receives the captured image and the information about the image capturing date and time of the captured image from the control unit 111 and transmits them to the server 103 via the communication network 101.

The communication unit 113 included in the server 103 receives from the client 102 the captured image and the information about the image capturing date and time of the captured image, and supplies them to the extraction unit 22. The extraction unit 22 supplies the captured image and the information about the image capturing date and time of the captured image to the recording unit 23 so as to cause the recording unit 23 to record them. Furthermore, the extraction unit 22 generates an identification pattern image from the captured image and supplies the generated identification pattern image to the recording unit 23 so as to cause the recording unit 23 to record the identification pattern image.

At the time of the identification and verification of the product 12 that is an inspection target product, the observation unit 21 included in the client 102 captures the image of the product 12, and supplies the captured image to the communication unit 112 via the control unit 111. The communication unit 112 transmits the captured image supplied from the control unit 111 to the server 103 via the communication network 101.

The communication unit 113 included in the server 103 receives the captured image transmitted from the client 102, and supplies the captured image to the extraction unit 22. The extraction unit 22 generates an input pattern image from the captured image, and supplies the generated input pattern image to the comparison unit 24. The comparison unit 24 performs the identification and verification of the product 12 by performing the generalized Hough transform process using the supplied input pattern image and the identification pattern image recorded in the recording unit 23, and supplies the identification verification result to the communication unit 113. The communication unit 113 transmits the identification verification result to the client 102.

The communication unit 112 included in the client 102 receives the identification verification result transmitted from the server 103 and supplies the received identification verification result to the output unit 25 via the control unit 111. The output unit 25 displays the result of the identification and verification of the product 12.

In an example illustrated in FIG. 19, only a single observation unit and only a single recording unit, that is, the observation unit 21 and the recording unit 23, are disposed. However, a plurality of observation units and a plurality of recording units may be disposed. In this case, for example, the client 102 is disposed in the house of a user, and another client having the same configuration as the client 102 is disposed at a different position, for example, in a pawn shop where a stolen product may be found or a baggage inspection area in an airport. The other client is also connected to the communication network 101.

For example, the observation unit 21 included in the client 102 disposed in the user's house is composed of a digital camera. The user operates the client 102 so that the image of the product 12, which is a desired valuable product, is captured and the captured image is transmitted to the server and is then recoded in the server. The server 103 receives the captured image transmitted from the client 102 and records it. Furthermore, the server 103 generates an identification pattern image from the captured image and records the generated identification pattern image.

If the user brings the product 12 to a baggage inspection area in an airport where the other client is disposed, the user can perform the identification and verification of the product 12 so as to determine whether the product 12 has been replaced with a fake product. That is, the other client captures the image of the product 12, which is an inspection target product, and transmits the captured image to the server 103 via the communication network 101.

The server 103 receives the captured image from the other client and generates an input pattern image from the received captured image. Subsequently, the server 103 performs the identification and verification of the product 12 using the generated input pattern image and the recorded identification pattern image and transmits the result of the identification and verification to the other client via the communication network 101.

As a result, the other client can receive the identification verification result transmitted from the server 103 and display it. Accordingly, in the baggage inspection area where the other client is disposed, the user can determine whether the product 12 has been stolen on the basis of the displayed identification verification result. A single server for recording an identification pattern image, that is, the server 103, may be disposed, or a plurality of servers may be disposed.

The above-described series of processes may be performed by hardware or software. If the series of processes are performed by software, a program configuring the software is installed from a program recording medium on a computer embedded in a piece of dedicated hardware or, for example, on a general-purpose personal computer that is allowed to perform various functions by installing various programs thereon.

FIG. 20 is a block diagram illustrating an exemplary hardware configuration of a computer that performs the above-described series of processes using a program.

In the computer, a CPU (Central Processing Unit) 201, a ROM (Read-Only Memory) 202, and a RAM (Random Access Memory) 203 are connected to each other via a bus 204.

The bus 204 is connected to an input/output interface 205. The input/output interface 205 is connected to an input unit 206 including a keyboard, a mouse, and a microphone, an output unit 207 including a display and a speaker, a recording unit 208 including a hard disk and an nonvolatile memory, a communication unit 209 including a network interface, and a drive for driving a removable medium 211 such as a magnetic disk, an optical disc, a magneto-optical disk, or a semiconductor memory.

In the computer having the above-described configuration, for example, the CPU 201 loads a program recorded in the recording unit 208 into the RAM 203 via the input/output interface 205 and the bus 204 and executes the program, whereby the above-described series of processes are performed.

For example, a program to be executed by the computer (the CPU 201) is recorded on the removable medium 211 that is a package medium such as a magnetic disk (including a flexible disk), an optical disc (including a CD-ROM (Compact Disc-Read-Only Memory) and a DVD (Digital Versatile Disc)), a magneto-optical disk, or a semiconductor memory and is provided. Alternatively, a program to be executed by the computer (the CPU 201) is provided via a wired or wireless communication medium such as a local area network, the Internet, or digital satellite broadcasting.

The removable medium 211 is attached to the drive 210, whereby the program recorded on the removable medium 211 can be installed in the recording unit 208 via the input/output interface 205. A program can be received by the communication unit 209 via a wired or wireless transmission medium and then be installed in the recording unit 208. Alternatively, a program can be installed in advance in the ROM 202 or the recording unit 208.

A program to be executed by a computer may be a program allowing the above-described series of processes to be performed in chronological order described above or a program allowing these processes to be concurrently performed or performed as necessary, for example, when the invocation of the program is performed.

It should be understood by those skilled in the art that various modifications, combinations, sub-combinations and alterations may occur depending on design requirements and other factors insofar as they are within the scope of the appended claims or the equivalents thereof.

What is claimed is:

1. A product identification apparatus for determining whether an inspection target product to be identified is the same as a predetermined verification product, comprising:
    extracting means for extracting an input pattern formed of asperities on the surface of a predetermined part of the inspection target product from a captured image obtained by capturing the image of the predetermined part of the inspection target product; and
    comparing means for:
        comparing the input pattern with an identification pattern extracted from a captured image obtained by capturing in advance the image of a part of the verification product
        determining, based on sizes and rotation angles of the input pattern and the identification pattern, a transformation parameter; and
        determining, using the transformation parameter, whether the input pattern is the same as the identification pattern or the input pattern includes the identification pattern.

2. The product identification apparatus according to claim 1, wherein the transformation parameter is used to make the sizes and rotation angles of the identification pattern and the input pattern conform to each other, and the comparing means determines the transformation parameter by performing generalized Hough transform processing using the input pattern and the identification pattern.

3. The product identification apparatus according to claim 1 further comprising image capturing means for capturing the image of the inspection target product.

4. The product identification apparatus according to claim 1 further comprising communicating means for receiving the captured image of the inspection target product transmitted from another apparatus connected to the product identification apparatus via a communication network and transmitting a comparison result obtained by the comparing means.

5. The product identification apparatus according to claim 1, wherein the comparing means detects the increase in the number of flaws on the part of the verification product on the basis of the difference between captured images of the identification pattern which have been captured at different image capturing times.

6. A product identification method of determining whether an inspection target product to be identified is the same as a predetermined verification product, comprising the steps, implemented by a computer, of:
    extracting an input pattern formed of asperities on the surface of a predetermined part of the inspection target product from a captured image obtained by capturing the image of the predetermined part of the inspection target product;

comparing the input pattern with an identification pattern extracted from a captured image obtained by capturing in advance the image of a part of the verification product determining, based on sizes and rotation angles of the input pattern and the identification pattern, a transformation parameter; and determining, using the transformation parameter, whether the input pattern is the same as the identification pattern or the input pattern includes the identification pattern.

7. The product identification method according to claim 6, wherein the transformation parameter is used to make the sizes and rotation angles of the identification pattern and the input pattern conform to each other, and the transformation parameter is determined by performing generalized Hough transform processing using the input pattern and the identification pattern.

8. The product identification method according to claim 6, further comprising capturing the image of the inspection target product.

9. The product identification method according to claim 6, further comprising receiving the captured image of the inspection target product via a communication network and transmitting a comparison result.

10. The product identification method according to claim 6, further comprising detecting the increase in the number of flaws on the part of the verification product on the basis of the difference between captured images of the identification pattern which have been captured at different image capturing times.

11. A non-transitory computer-readable medium for a product identification process of determining whether an inspection target product to be identified is the same as a predetermined verification product, the non-transitory computer-readable medium causing a computer to perform a process comprising the steps of:

extracting an input pattern formed of asperities on the surface of a predetermined part of the inspection target product from a captured image obtained by capturing the image of the predetermined part of the inspection target product;

comparing the input pattern with an identification pattern extracted from a captured image obtained by capturing in advance the image of a part of the verification product determining, based on sizes and rotation angles of the input pattern and the identification pattern, a transformation parameter; and determining, using the transformation parameter, whether the input pattern is the same as the identification pattern or the input pattern includes the identification pattern.

12. The non-transitory computer-readable medium according to claim 11, wherein the transformation parameter is used to make the sizes and rotation angles of the identification pattern and the input pattern conform to each other, and the transformation parameter is determined by performing generalized Hough transform processing using the input pattern and the identification pattern.

13. The non-transitory computer-readable medium according to claim 11, wherein the process further comprises capturing the image of the inspection target product.

14. The non-transitory computer-readable medium according to claim 11, wherein the process further comprises receiving the captured image of the inspection target product via a communication network and transmitting a comparison result.

15. The non-transitory computer-readable medium according to claim 11, wherein the process further comprises detecting the increase in the number of flaws on the part of the verification product on the basis of the difference between captured images of the identification pattern which have been captured at different image capturing times.

16. A product identification apparatus for determining whether an inspection target product to be identified is the same as a predetermined verification product, comprising:

an extraction unit configured to extract an input pattern formed of asperities on the surface of a predetermined part of the inspection target product from a captured image obtained by capturing the image of the predetermined part of the inspection target product; and a comparison unit configured to:
  compare the input pattern with an identification pattern extracted from a captured image obtained by capturing in advance the image of a part of the verification product;
  determine, based on sizes and rotation angles of the input pattern and the identification pattern, a transformation parameter; and
  determine, using the transformation parameter, whether the input pattern is the same as the identification pattern or the input pattern includes the identification pattern.

17. The product identification apparatus according to claim 16, wherein the transformation parameter is used to make the sizes and rotation angles of the identification pattern and the input pattern conform to each other, and the comparison unit determines the transformation parameter by performing generalized Hough transform processing using the input pattern and the identification pattern.

18. The product identification apparatus according to claim 16, further comprising an image capturing unit for capturing the image of the inspection target product.

19. The product identification apparatus according to claim 16, further comprising a communication unit for receiving the captured image of the inspection target product transmitted from another apparatus connected to the product identification apparatus via a communication network and transmitting a comparison result obtained by the comparison unit.

20. The product identification apparatus according to claim 16, wherein the comparison unit detects the increase in the number of flaws on the part of the verification product on the basis of the difference between captured images of the identification pattern which have been captured at different image capturing times.

* * * * *